US012352228B2

(12) United States Patent
French, III

(10) Patent No.: US 12,352,228 B2
(45) Date of Patent: Jul. 8, 2025

(54) FUEL INJECTOR

(71) Applicant: Billet Machine and Fabrication, Inc., Toano, VA (US)

(72) Inventor: Jack McClain French, III, Toano, VA (US)

(73) Assignee: Billet Machine and Fabrication, Inc., Toano, VA (US)

(*) Notice: Subject to any disclaimer, the term of this patent is extended or adjusted under 35 U.S.C. 154(b) by 0 days.

(21) Appl. No.: 18/436,607

(22) Filed: Feb. 8, 2024

(65) Prior Publication Data

US 2024/0183329 A1 Jun. 6, 2024

Related U.S. Application Data

(63) Continuation of application No. 17/959,942, filed on Oct. 4, 2022, now Pat. No. 11,939,940.

(60) Provisional application No. 63/315,342, filed on Mar. 1, 2022, provisional application No. 63/251,901, filed on Oct. 4, 2021.

(51) Int. Cl.
*F02M 51/06* (2006.01)

(52) U.S. Cl.
CPC ................................ *F02M 51/0671* (2013.01)

(58) Field of Classification Search
CPC ....... F02M 2200/8092; F02M 2200/80; F02M 2200/8015; F02M 2200/8023; F02M 2200/8076; F02M 51/0671; F02M 61/168; F02M 61/08; F02M 61/167; F02M 61/18; F02M 59/48; F02M 51/005; F02M 51/0696; F02M 51/0603; F02M 2200/16

See application file for complete search history.

(56) References Cited

U.S. PATENT DOCUMENTS

| | | | |
|---|---|---|---|
| 723,956 | A | 3/1903 | Weiss |
| 1,396,978 | A | 11/1921 | Tacchella |
| 1,664,616 | A | 4/1928 | French |
| 1,970,801 | A | 8/1934 | Hurst |

(Continued)

FOREIGN PATENT DOCUMENTS

| | | | |
|---|---|---|---|
| JP | H11-132127 | A | 5/1999 |
| WO | WO 2007/033859 | A1 | 3/2007 |

OTHER PUBLICATIONS

Complaint for Patent Infringement in U.S. Case No. 1:2021cv00974, "*Billet Machine and Fabrication, Inc.* v. *FuelTech USA, LLC*," U.S. District Court for the Northern District of Georgia, filed on Mar. 8, 2021, 69 pages.

*Primary Examiner* — Christopher R Dandridge
(74) *Attorney, Agent, or Firm* — Fish & Richardson P.C.

(57) ABSTRACT

In general, the subject matter described in this disclosure can be embodied in a fuel injector that includes an upper housing portion that defines an inlet passage adapted to receive fuel, and a lower housing portion that is attached to the upper housing portion and that defines an injector outlet adapted to dispense fuel. The fuel injector includes an electromagnetic coil assembly that is user removable while the upper housing portion remains attached to the lower housing portion. The fuel injector includes a movable pintle that is biased to a closed position that is adapted to prevent fuel from flowing through the injector outlet, and movable, responsive to magnetic force produced by energizing the electromagnetic coil assembly, to an open position that is adapted to permit fuel to flow through the injector outlet.

14 Claims, 22 Drawing Sheets

(56) References Cited

U.S. PATENT DOCUMENTS

| | | | | |
|---|---|---|---|---|
| 2,088,007 | A | 7/1937 | Zumbusch | |
| 3,004,720 | A | 10/1961 | Knapp et al. | |
| 3,241,768 | A | 3/1966 | Croft | |
| 3,669,361 | A | 6/1972 | Guèret | |
| 3,913,537 | A | 10/1975 | Ziesche et al. | |
| 4,590,911 | A | 5/1986 | Sciotti et al. | |
| 4,750,675 | A | 6/1988 | Sczomak | |
| 4,784,322 | A | 11/1988 | Daly | |
| 4,984,744 | A | 1/1991 | Babitzka et al. | |
| 4,993,643 | A | 2/1991 | Schechter et al. | |
| 5,127,585 | A | 7/1992 | Mesenich | |
| 5,294,057 | A | 3/1994 | Hamilton | |
| 5,312,050 | A | 5/1994 | Schumann et al. | |
| 5,626,292 | A | 5/1997 | Armaroli et al. | |
| 5,996,910 | A | 12/1999 | Takeda et al. | |
| 6,012,433 | A | 1/2000 | Buescher | |
| 6,112,720 | A | 9/2000 | Matta | |
| 6,131,829 | A | 10/2000 | Ricco | |
| 6,152,387 | A | 11/2000 | Ricco | |
| 6,168,094 | B1 | 1/2001 | Schatz et al. | |
| 6,206,304 | B1 | 3/2001 | Koseki et al. | |
| 6,244,525 | B1 | 6/2001 | Gallup et al. | |
| 6,279,843 | B1 | 8/2001 | Coldren et al. | |
| 6,345,601 | B1 | 2/2002 | Miyajima et al. | |
| 6,409,094 | B2 | 6/2002 | Tojo et al. | |
| 6,409,102 | B1 | 6/2002 | Luttrell et al. | |
| 6,481,646 | B1 | 11/2002 | Hornby | |
| 6,502,767 | B2 | 1/2003 | Kay et al. | |
| 6,671,611 | B1 | 12/2003 | Peltier | |
| 6,679,435 | B1 | 1/2004 | Noller et al. | |
| 6,769,176 | B2 | 8/2004 | Hornby | |
| 6,769,635 | B2 | 8/2004 | Stewart et al. | |
| 6,843,434 | B2 | 1/2005 | Lawrence et al. | |
| 7,040,667 | B2 | 5/2006 | Nieslony | |
| 7,136,743 | B2 | 11/2006 | Peltier | |
| 7,266,515 | B2 | 9/2007 | Costello et al. | |
| 7,407,120 | B1 * | 8/2008 | French | F02M 51/0675 239/585.5 |
| 7,571,715 | B2 | 8/2009 | Frasch et al. | |
| 8,316,825 | B1 * | 11/2012 | French, III | F02M 51/0671 123/472 |
| 10,208,648 | B1 * | 2/2019 | Cooper | F01P 7/14 |
| 2001/0022320 | A1 * | 9/2001 | Tojo | F02M 61/168 239/96 |
| 2002/0084344 | A1 | 7/2002 | Dallmeyer et al. | |
| 2002/0117557 | A1 | 8/2002 | Potschin et al. | |
| 2003/0019955 | A1 | 1/2003 | Schraudner et al. | |
| 2004/0158384 | A1 | 8/2004 | Kuegel et al. | |
| 2006/0283988 | A1 * | 12/2006 | Mochizuki | F02M 61/20 239/585.4 |
| 2012/0180754 | A1 * | 7/2012 | Takaoku | F02M 61/168 123/294 |
| 2023/0109492 | A1 | 4/2023 | French, III | |

* cited by examiner

FUEL INJECTOR

REFERENCE TO RELATED APPLICATIONS

This application is a continuation of U.S. application Ser. No. 17/959,942, filed on Oct. 4, 2022, which claims the benefit of U.S. Provisional Application Ser. No. 63/251,901, filed Oct. 4, 2021, and U.S. Provisional Application Ser. No. 63/315,342, filed Mar. 1, 2022, the entire contents of each application being incorporated herein in their entirety.

TECHNICAL FIELD

This document generally relates to electronic fuel injectors.

BACKGROUND

An internal combustion engine operates by combusting fuel to drive one or more cylinders. Fuel injectors inject fuel into an engine to form an air-fuel mixture for combustion.

SUMMARY

This document describes the structure and function of various different electronic fuel injectors and components that form those injectors. Electronic fuel injectors dispense a dose of fuel when provided with a pulse of electrical energy. A pulse of electrical energy to an electronic fuel injector energizes an electromagnetic coil in the injector, which produces a magnetic force that physically moves a component to open a valve so that pressured fuel can flow freely through the fuel injector. The component that moves to open and close the valve is a pintle that is movable between: (i) a closed position in which the pintle contacts a valve seat to prevent fuel flow past the valve seat, and (ii) an open position in which the pintle is pulled away from the valve seat by a magnetic force, which enables fuel flow. The fuel injectors described herein are structured to provide many advantages.

For example, this disclosure references a guide that forms a fluid bearing, using pressurized fuel contained within the injector, to center the movable pintle during movement. The guide minimizes friction and wear on the guide and pintle, and facilitates rapid and consistent opening and closing times. The guide can define channels that are adapted to store pressured fuel adjacent a valve sealing surface. The valve sealing surface is a surface at which the movable pintle contacts a valve seat when the fuel injector is in a closed state, and it is this contact that prevents fuel from flowing past the valve seat. The location and shape of the fuel channels provides immediate fuel delivery once the pintle begins to move, and ensures sufficient fuel flow once the injector has transitioned to a fully open state.

As another example, this disclosure references a filter that is located within the fuel passage, near a fuel entrance to the fuel passage. The filter may be integrated with the fuel injector, and capture any contaminants that may not have been filtered by an upstream fuel pump filter. For example, a fuel pump filter is not able to remove contaminants that are present in fuel lines that are located after the fuel pump filter, such as contaminants introduced to such fuel lines during maintenance. Also, small contaminants that pass through the fuel pump filter can collect in the fuel lines and aggregate into larger contaminants that release into the fuel stream and end up in the fuel injector. Such contaminants can lodge between moving surfaces of fuel injectors and cause them to stick open, dispensing uncontrolled amounts of fuel and risking severe engine damage. A filter that is integrated with the fuel injector may be rigid. It can be user removable, cleanable, and/or replaceable. An example fuel filter is made of sintered stainless steel felt mesh. Such a filter can be structured to capture contaminants at an entrance to the fuel injector, while permitting high fuel flow rates.

As another example, this disclosure references a user-movable calibration insert that can be manipulated by a user to change an amount of spring force imparted by a spring in a fuel injector to the movable pintle, to bias the movable pintle to the closed position (and move the pintle to the closed position after the injector has been opened). The spring force is user adjustable because moving the calibration insert further into the injector (toward the fuel exit) reduces a distance between surfaces that seat different ends of the spring, compressing the spring and increasing the force it applies. Conversely, moving the calibration insert back out of the injector (toward the fuel entrance) increases the distance between the surfaces that seat the ends of the spring, relaxing the spring and decreasing the force that it applies. The calibration insert can be moved in both directions, without any need to disassemble the injector. The spring force affects the amount of fuel that flows in a given pulse, and the ability to calibrate the spring force using the calibration insert enables a user to adjust flow rates and injector operating characteristics without opening the injector.

As another example, an inlet tube portion of the injector may be threaded into a passage through an upper housing body of the injector. Like with the calibration insert, this threaded engagement enables users to twist the inlet tube portion into and out of a remaining portion of the injector, to adjust a distance between an end of the inlet tube portion and a top of the movable pintle (when the movable pintle is in the closed position). This distance, called a "lift gap", represents a distance that the pintle is able to move away from the valve seat, which directly affects an amount of fuel that can flow past an end of the pintle when the pintle is in the open position. The inlet tube portion may be inserted into the injector while a lower housing portion and an upper housing body remain assembled together. Such a configuration enables user removal of the inlet tube portion and the movable pintle while certain components of the injector remain assembled.

As another example, a coil assembly that is adapted to form a magnetic field from received electricity is user removable, without having to disassemble the fuel injector to reveal any of the interior spaces in which fuel collects. For example, the coil assembly may surround an exterior peripheral wall of an upper housing portion of the fuel injector, and the coil assembly may be slid off and apart from a remainder of the injector (e.g., after removing a retention clip to free the coil assembly). A different coil assembly may then be placed back onto the reminder of the injector. Such an ability to easily replace a coil assembly on an injector is advantageous, because coil assemblies can be damaged by engine fires, short out, or experience other types of failures. A user can replace a coil assembly without exposing internal spaces of the injector, which may involve maintenance processes that some users prefer be done by an authorized maintenance facility. Still, the injector is adapted to be entirely disassembled and reassembled by end users, to enable end users to periodically clean internal injector components and replace internal components (e.g., replace O-rings).

As another example, a wall between the coil assembly and the passage in which the pintle moves may include a thinned section that spans a location of an impact fact to which the pintle is pulled when the pintle is moving from the closed position to the open position. This thinned section is located to increase magnetic forces imparted upon a top section of the movable pintle, which is a portion of the movable pintle that experiences the greatest magnetic forces. Increasing the magnetic flux with such techniques can enable faster injector opening and closing times, and smaller coil sizes.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document describes electronic fuel injectors and components thereof. FIGS. 1-10B show a first fuel injector and components thereof. FIGS. 11-18B show a second fuel injector and components thereof. FIGS. 19A-23B show components of the second fuel injector or component variations that can be implemented in both fuel injectors.

First Fuel Injector—Fuel Injector Components

Figure 1:
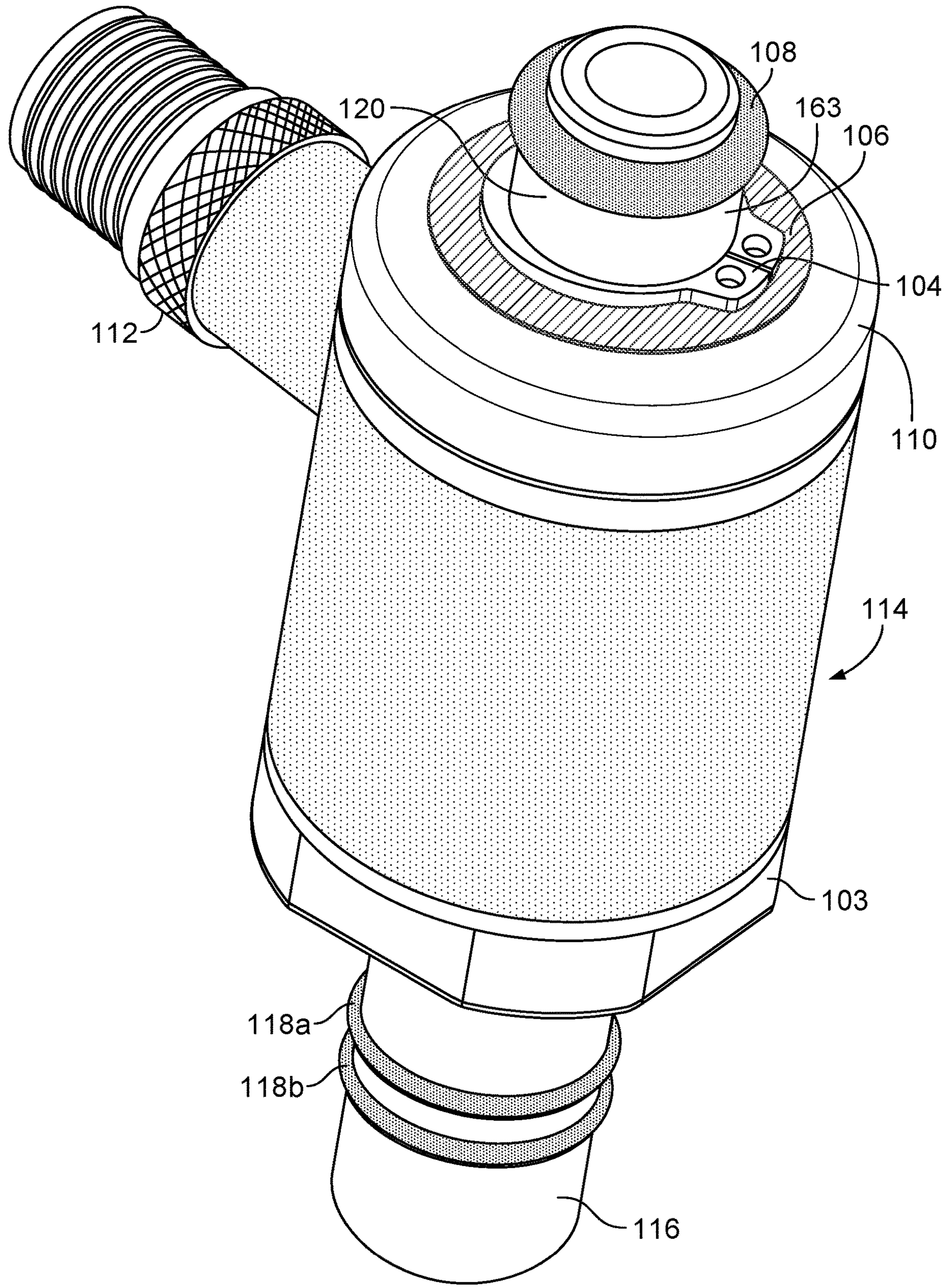
FIG. 1 shows a perspective view of a first fuel injector.
Figure 2:
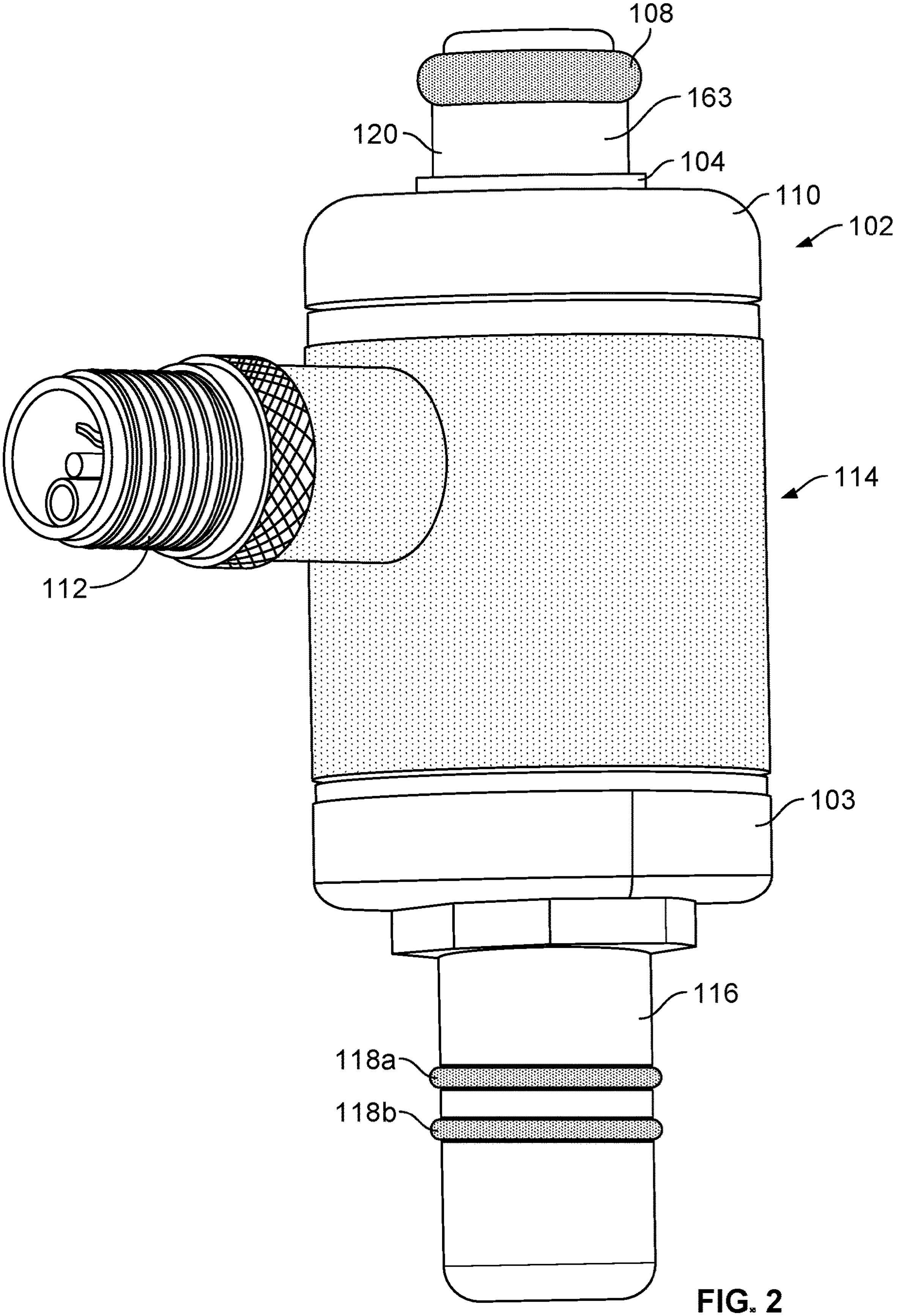
FIG. 2 shows a side view of the first fuel injector.
Figure 4:
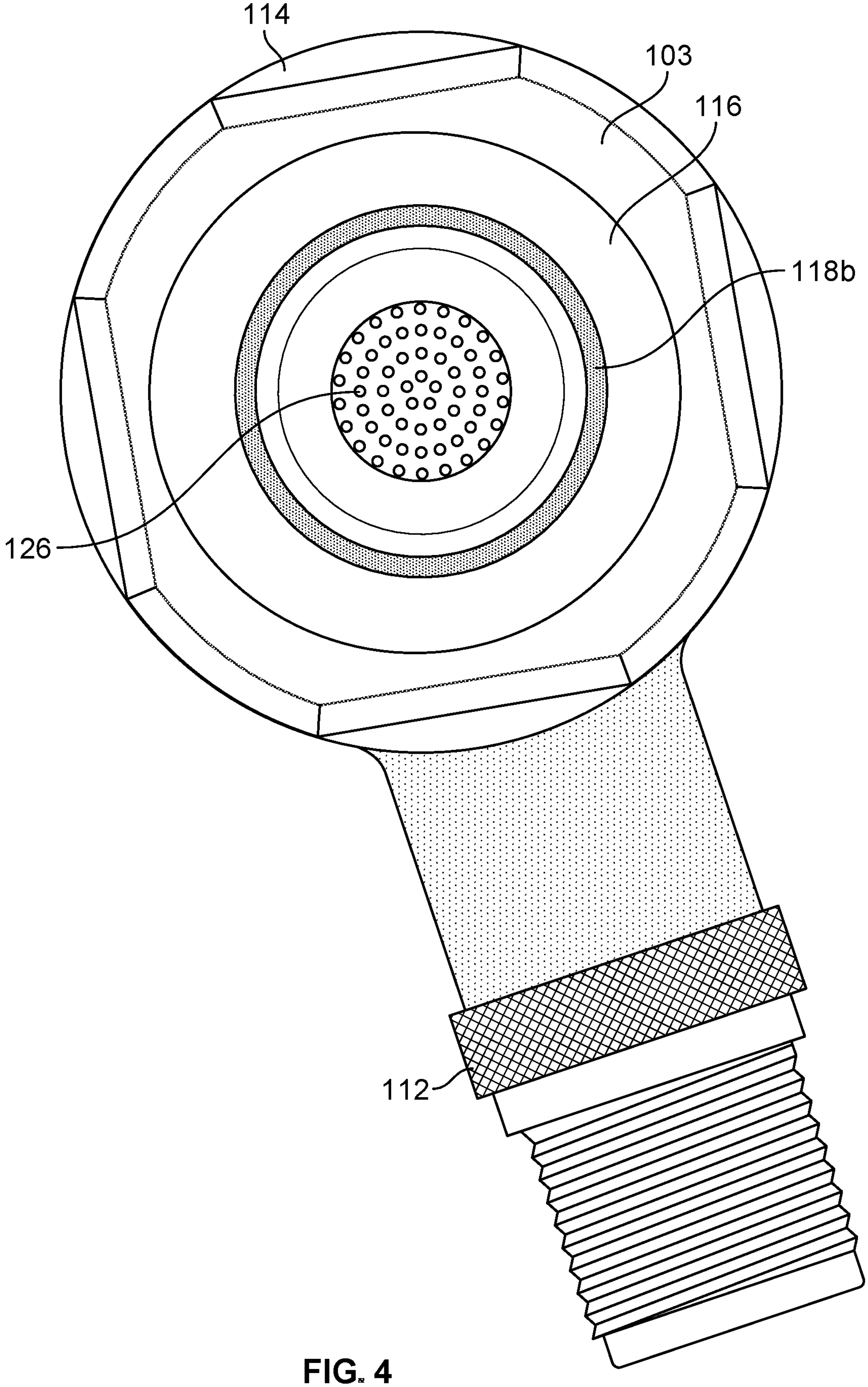
FIG. 4 shows a bottom view of the first fuel injector.
Figure 5:
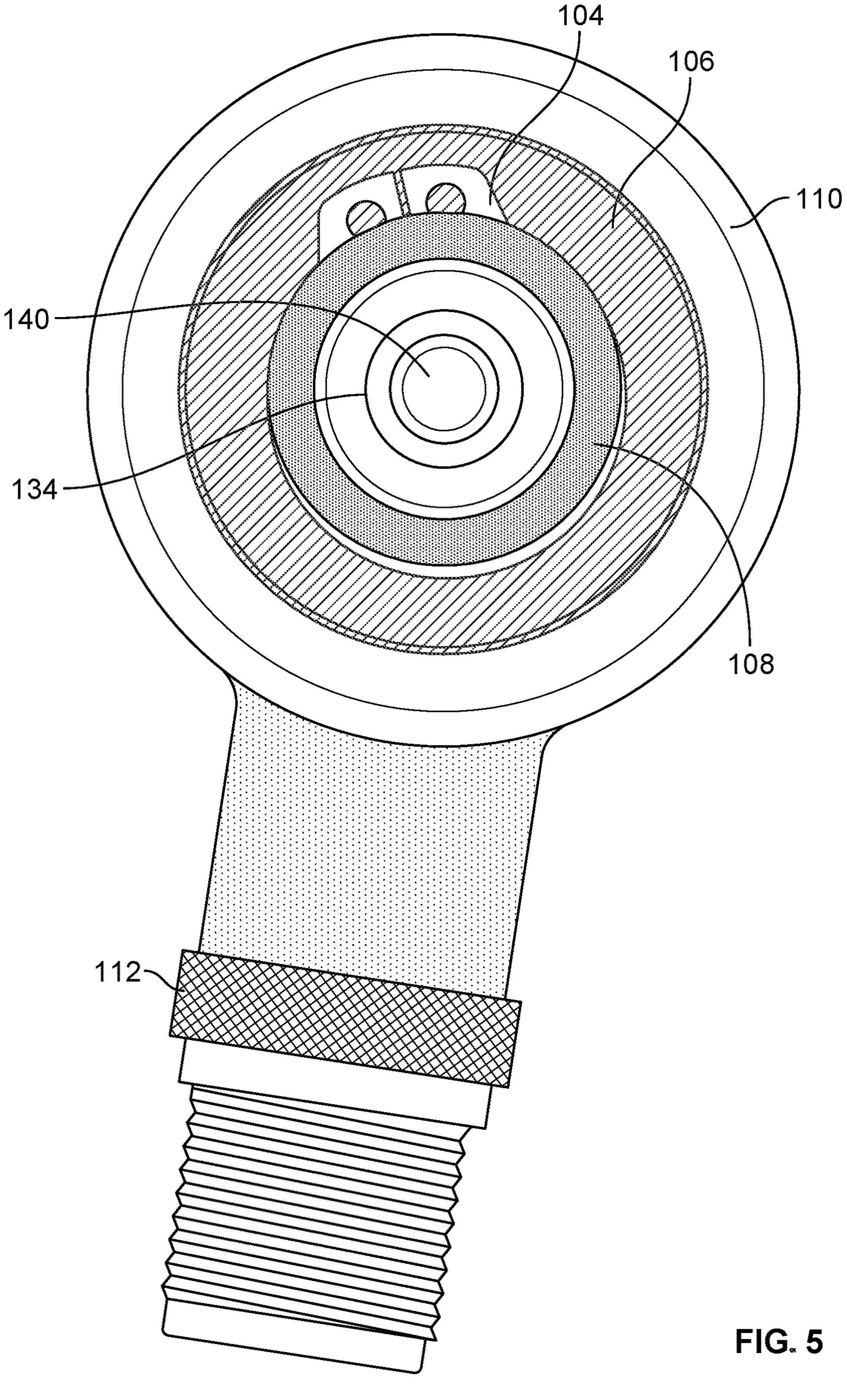
FIG. 5 shows a top view of the first fuel injector.

External views of the first fuel injector are provided in FIG. 1 (perspective view), FIG. 2 (side view), FIG. 4 (bottom view), and FIG. 5 (top view). Components of the first fuel injector that are externally visible include an upper housing portion 102 (which includes an upper housing inlet tube 120 and an upper housing body 103), a lower housing portion 116, a snap ring 104, a lip seal 106 (only visible externally in the perspective view of FIG. 1 and the top view of FIG. 5), a seal retainer 110, a top O-ring 108, a coil assembly 114 (which includes an electrical connector 112), lower O-rings 118*a-b*, and an atomization disc 126 (only visible externally in the bottom view of FIG. 4).

Figure 3:
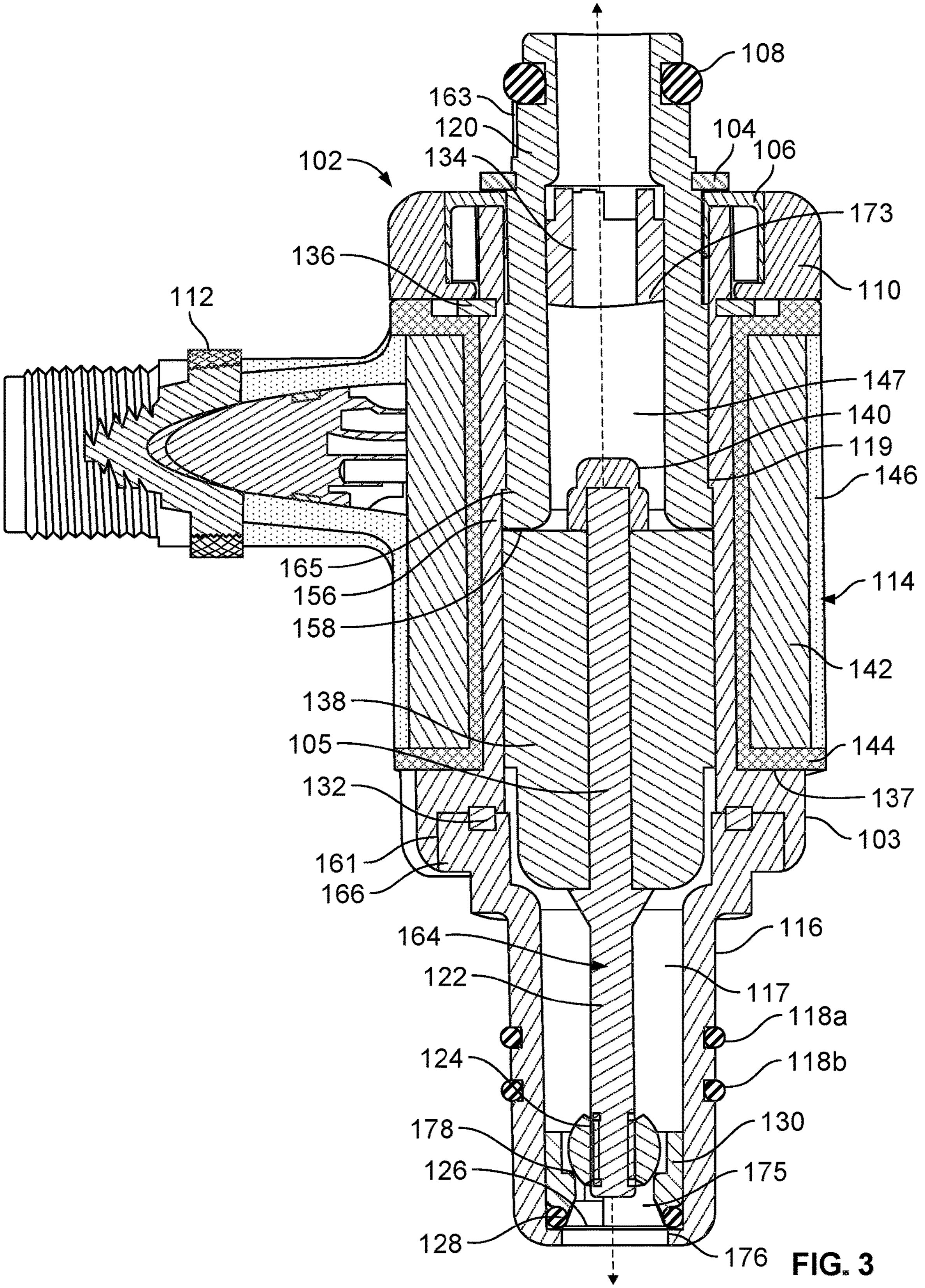
FIG. 3 shows a sectional side view of the first fuel injector.

A sectional side view of the first fuel injector is provided by FIG. 3. Components not already described as being externally visible include a movable pintle 164, a lower guide and valve seat component 130, a valve seat O-ring 128, a housing-sealing O-ring 132, and a calibration insert 134.

The movable pintle 164 includes multiple sub-components, including a pin 122, a ball 124, an armature 138, and a cap 140. The coil assembly 114 includes multiple sub-components, including a coil 142, a bobbin 144 around which a wire that forms the coil 142 is wound, and coil overmolding 146 that is molded onto the coil 142 and that provides protection to the wire in the coil 142.

First Fuel Injector—Assembly

The lower housing portion 116 is removably attachable to the upper housing portion 102 by threading the components together using outward-facing threads 166 of the lower housing portion 116 and inward-facing threads 161 of the upper housing portion 102. The housing-sealing O-ring 132 forms a seal between the lower housing portion 116 and the upper housing portion 102 when the housing portions are attached together, which prevents fuel that is located inside the fuel injector from leaking out of the fuel injector through the threads 161 and 166.

Prior to the lower housing portion 116 and the upper housing portion 102 being assembled together, the upper housing inlet tube 120 (with the calibration insert 134 already threaded thereinto) is inserted from an underside of the upper housing portion 102 into the bore in the upper housing portion 102. The upper housing inlet tube 120 includes outward-facing threads 165 that engage inward-facing threads 156 of the upper housing body 103, enabling precise locating of the upper housing inlet tube 120 within the passage that is defined by the upper housing body 103.

To assemble the coil assembly 114 and the upper housing portion 102 together, the coil assembly 114 (with the electrical connector 112 attached thereto) is slid down over a top of the upper housing portion 102 and retained in place with snap ring 136. The coil assembly 114 and the upper housing portion 102 may be assembled before the upper housing portion 102 is attached to the lower housing portion 116, or before.

The seal 106 is press fit into the seal retainer 110, and the assembly of both components can be attached to the upper housing portion 102 after the coil assembly 114 and upper housing inlet tube 120 have been attached to the upper housing body 103. The assembly of the seal 106 and the seal retainer 110 is attached to the upper housing portion by sliding the assembly down over a top of the upper housing body 103, so that an inner circumferential lip of the seal 106 is inserted between the upper housing body 103 and the upper housing inlet tube 120. The snap ring 104 is then attached, holding the seal 106 and seal retainer 110 in place. The seal 106 can prevent fuel that is located inside of the injector from leaking out of the interface between the upper housing inlet tube 120 and the upper housing body 103.

Figure 6:
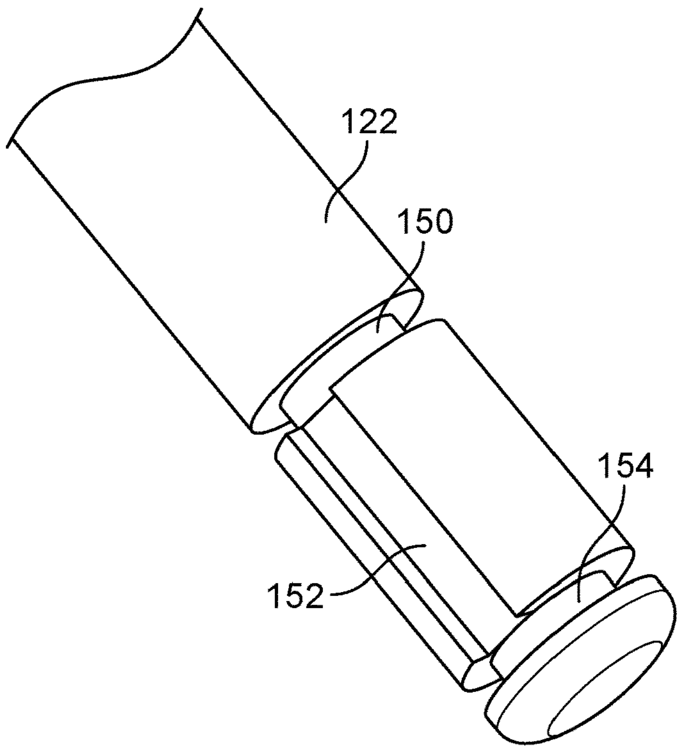
FIG. 6 shows a pin of a movable pintle of the first fuel injector.
Figure 7:
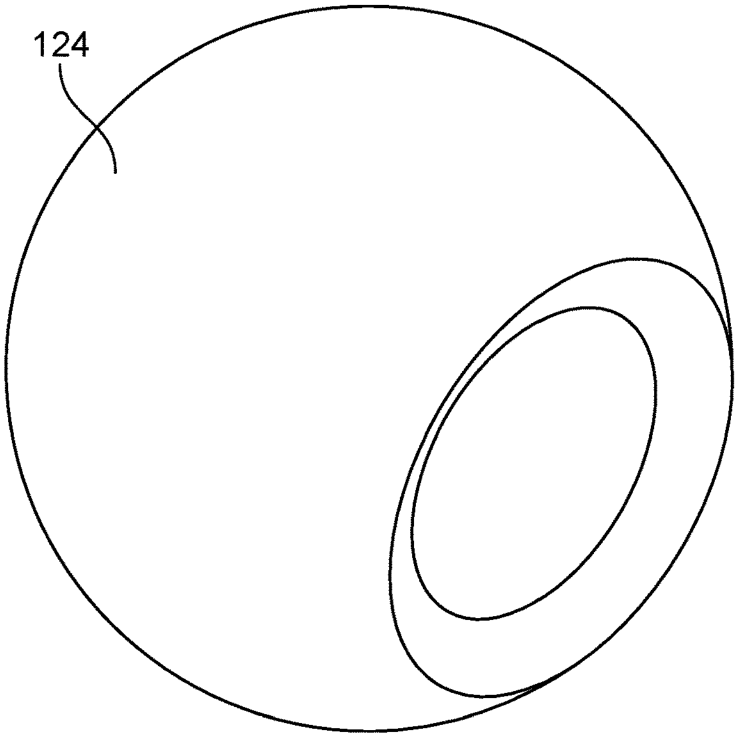
FIG. 7 shows a ball of the movable pintle of the first fuel injector.
Figure 8A:
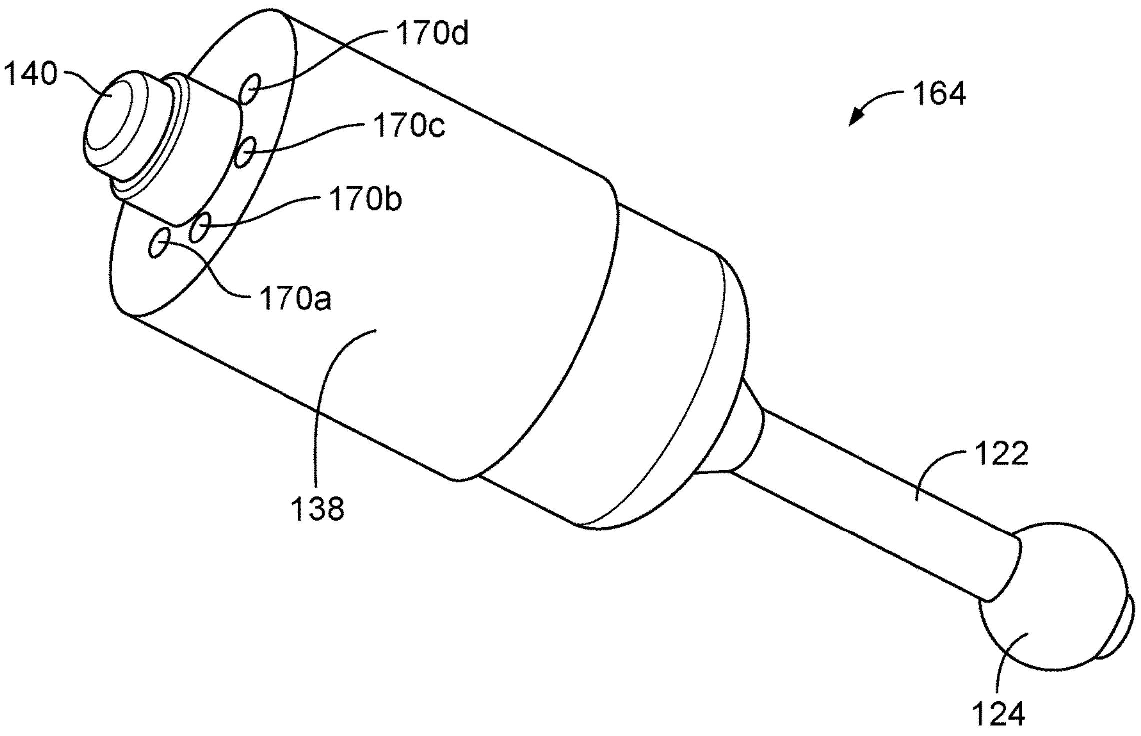
FIGS. 8A-B show various views of the movable pintle of the first fuel injector.
Figure 8B:
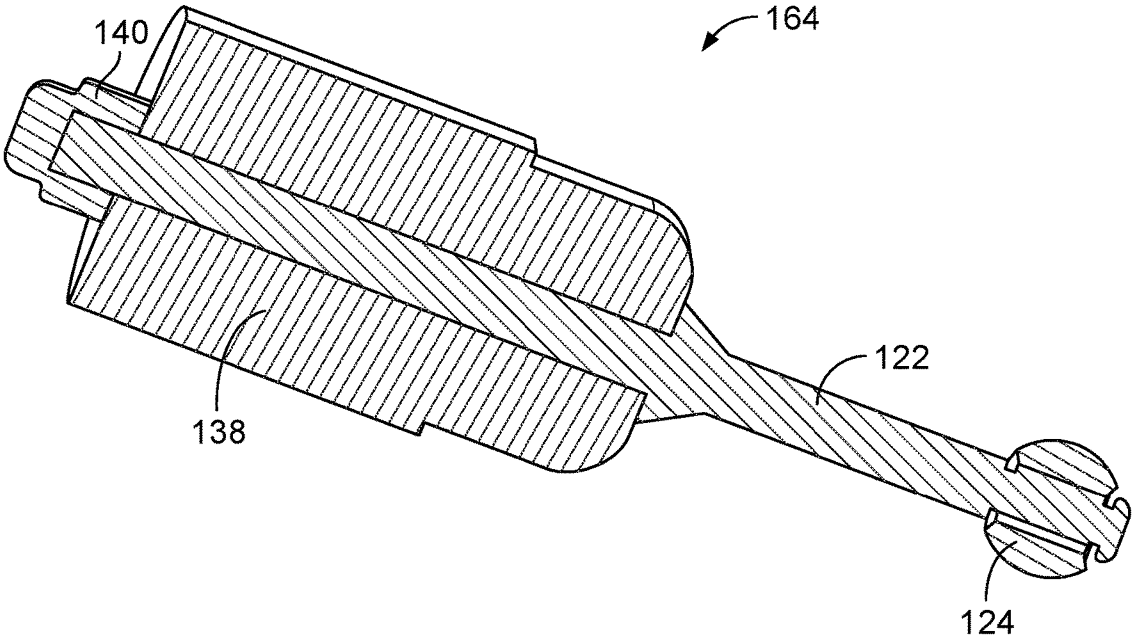
Figure 9:
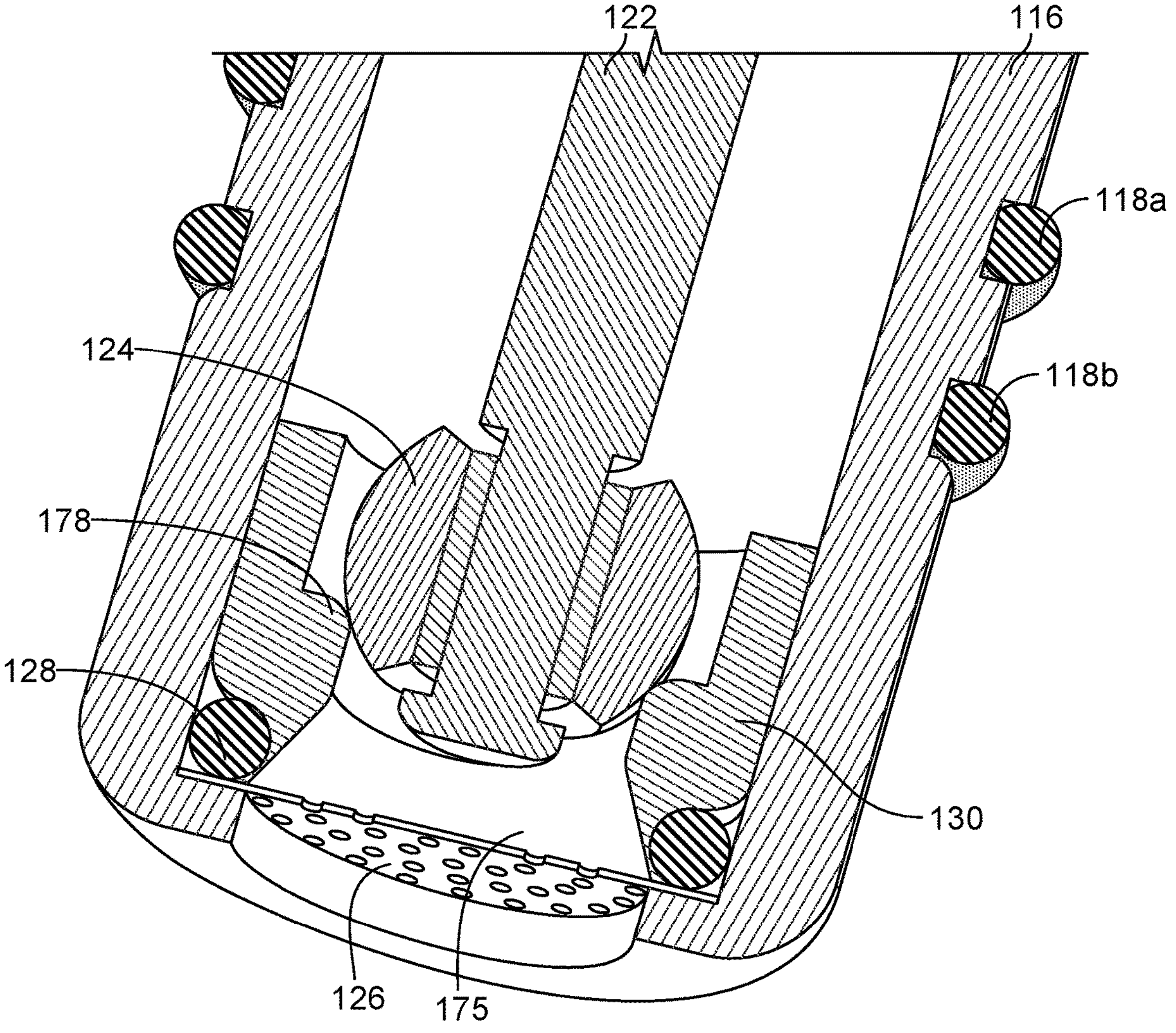
FIG. 9 shows a sectional perspective view of a bottom portion of the first fuel injector.

The movable pintle 164 is then assembled if not already done. As described above, the movable pintle 164 includes a pin 122, a ball 124, an armature 138, and a cap 140. As shown in FIG. 6, the pin 122 includes annular channels 150 and 154, connected by one or more vertical channels 152. The ball 124 (shown in detail in FIG. 7) is inserted over the pin 122 and adhered to the pin 122 through injection of an adhesive or molding material into the channels 150, 152, and 154. The armature 138 is inserted over a top portion of the pin 122 and retained in place by cap 140. A perspective view of the movable pintle 164 is shown in FIG. 8A, with a sectional side view of the movable pintle 164 being shown in FIG. 8B.

First Fuel Injector—Operation

The first fuel injector is attached to a component of an engine to direct fuel to a corresponding cylinder of the engine (e.g., through fuel injection into an intake manifold or through direct injection into the cylinder). Pressurized fuel is introduced into the first fuel injector through inlet passage 147 of upper housing inlet tube 120, which may be a bore that varies in diameter and that includes threading for the calibration insert 134. The pressurized fuel continues into the injector by flowing through a passage that extends through the calibration insert 134, through a remainder of the inlet passage 147 until the fuel exits the inlet passage, and through six vertical internal passages that extend through the armature 138 (intakes 170*a-d* to four such passages are visible in FIG. 8A). Fuel that exits the internal passages through the armature 138 fills a pintle-receiving passage 117 that is formed by the lower housing portion 116.

Figure 10A:
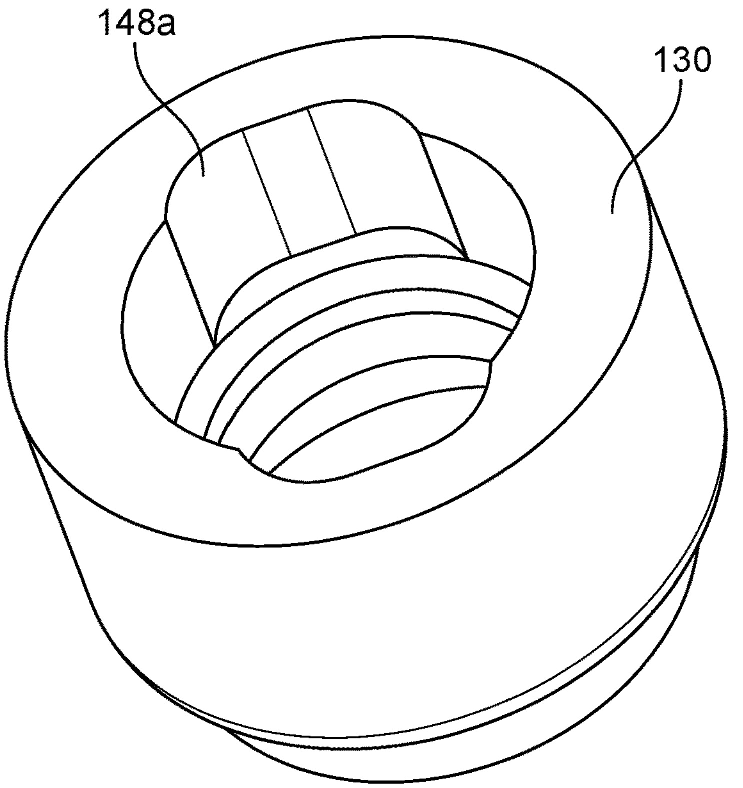
FIGS. 10A-B show perspective views of a lower guide and valve seat component of the first fuel injector.
Figure 10B:
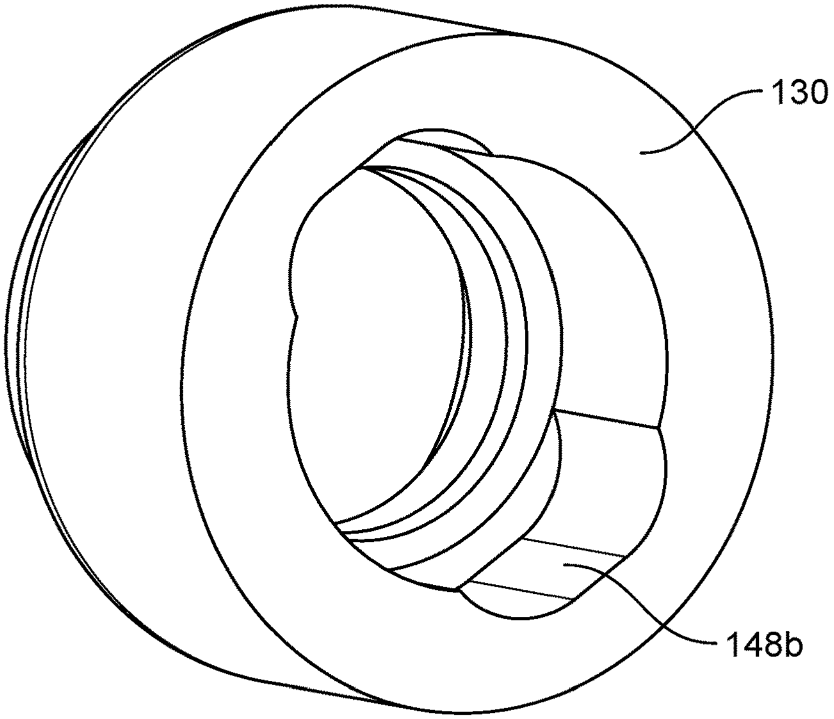

As shown in FIGS. 10A-B, the lower guide and valve seat component 130 includes two channels 148*a-b* through which fuel is allowed to flow partially past the ball 124. The pressurized fuel fills the fuel injector spaces described above, including the channels 148*a-b* defined by the lower guide and valve seat component 130, but the pressurized fuel cannot flow completely past the ball 124 due to contact between the ball 124 and an annular seating surface 178 of the lower guide and valve seat component 130 (shown best in FIG. 9). The movable pintle 164 is biased downward (thus forming and maintaining an annular seal where the ball 124 contacts the annular seating surface 178) by a spring (not shown) that is located in compression between a spring-seating surface 173 of the calibration insert 134 and a spring-seating surface 174 of the armature 138.

The injector pulses fuel in response to an electric pulse that is received from an electronic control unit (ECU) and that is provided to the coil 142 via electrical connector 112. The electrical connector 112 is electrically connected to the coil 142, energizing the coil 142 responsive to receipt of the electric pulse and forming a magnetic field. The magnetic field formed by the coil 142 provides a magnetic force that attracts the armature 138. As a result of the magnetic attraction, the movable pintle 164 is pulled upwards, overcoming the downward bias provided by the spring that is located between the calibration insert 134 and the armature 138 of the movable pintle 164. The movable pintle 164 moves from its closed position in which the movable pintle 164 is contacts the valve seat portion of component 130 to an open position in which the movable pintle 164 contacts a bottom end wall of the upper housing inlet tube 120. The fuel injector defines a pintle-movement axis 105 along a direction of movement of the movable pintle 164 between the closed position and the open position.

Movement of the movable pintle 164 upwards produces a gap at the annular seating surface 178 between the ball 124 and the lower guide and valve seat component 130. As such, pressurized fuel can flow past the ball 124 into the expansion region 175 (see FIGS. 3 and 9) and then through atomization disc 126, which helps form the fuel into small droplets that pass through an injector outlet 176.

Once the electrical pulse ends, the magnetic field subsides and the spring pushes the movable pintle 164 downward, interrupting fuel supply out of the end of the first fuel injector.

First Fuel Injector—Calibration and Repair

A distance between the calibration insert 134 and the spring-seating surface 174 of the armature 138, along with the type of spring located there between, affects the spring force that is imparted to the movable pintle 164. The spring force affects the timing and dynamic speed at which the movable pintle 164 moves upward responsive to an attractive magnetic force (and correspondingly downward after the pulse ends). The spring force can be adjusted by inserting an instrument through the inlet passage 147 while the injector remains fully assembled, and turning the calibration insert 134. As discussed previously, the calibration insert 134 is threaded into the inlet passage 147 of the upper housing inlet tube 120. As such, turning the calibration insert 134 with the instrument moves the calibration insert 134 up and/or down, enabling a user to modify the spring force imparted upon the armature 138 and therefore the rate at which the injector opens and closes.

The distance between the armature 138 and the upper housing inlet tube 120 (shown as the lift gap 158 in FIG. 3) affects the distance that that the movable pintle 164 moves upward. This distance corresponds to the size of the gap formed between the ball 124 and the annular seating surface 178, and therefore the amount of fuel that flows from the injector when the injector is in a fully open state. The upper housing inlet tube 120 is threaded into the upper housing body 103 using outward-facing threads 165 of the upper housing inlet tube and inward-facing threads 156 of the upper housing body 103. A user may turn the upper housing inlet tube 120 by gripping the flats 163 of the upper housing inlet tube 120, moving the upper housing inlet tube 120 up and/or down to change the size of the lift gap 158.

The coil assembly 114 is external to the upper housing portion 102, and may be replaced while much of the first fuel injector remains assembled. For example, after the snap ring 104 and the seal 106 and seal retainer 110 are removed, the coil assembly 114 (with the attached electrical connector 112) may be slid upwardly off the upper housing portion 102.

Second Fuel Injector—Fuel Injector Components

Figure 11:
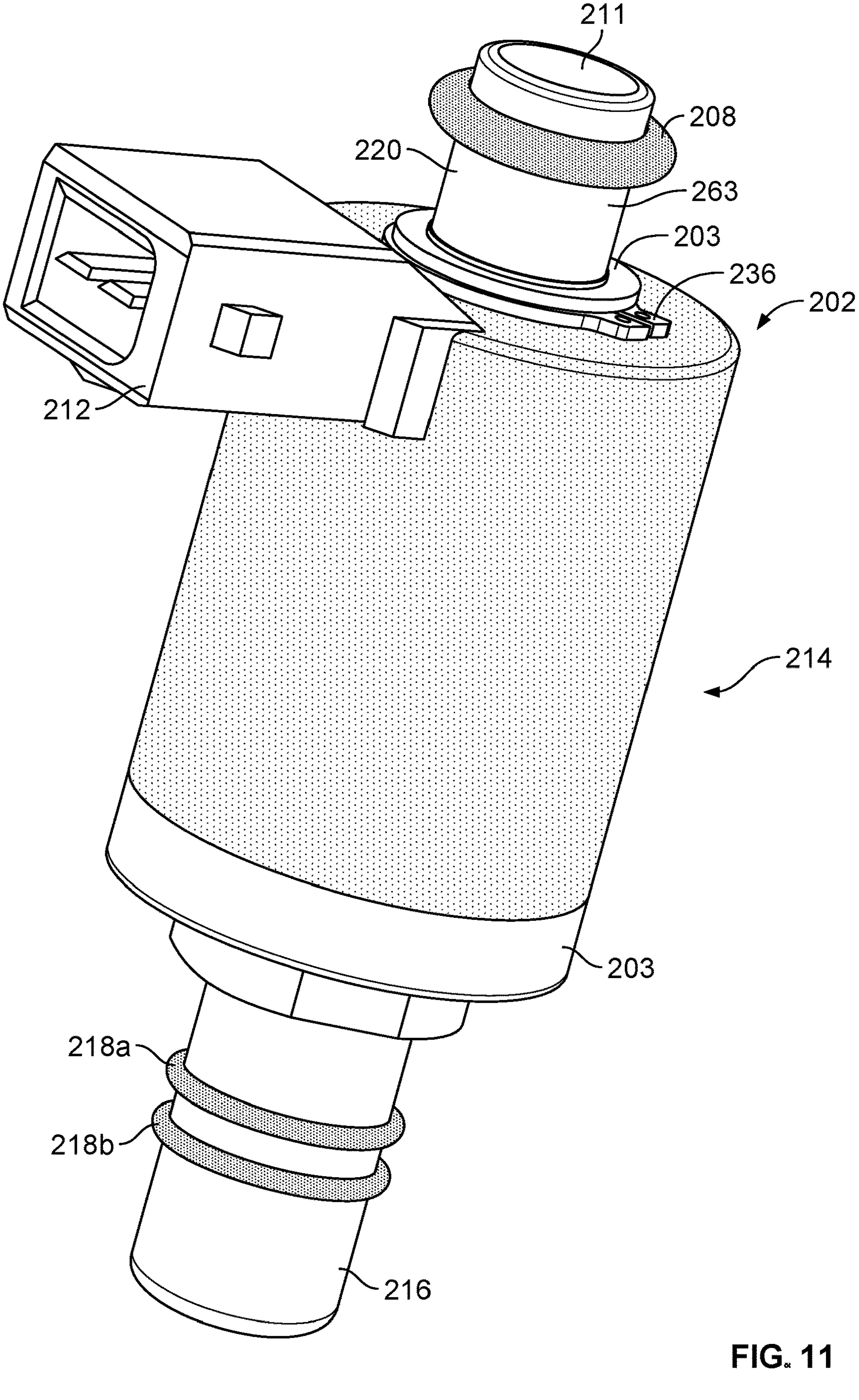
FIG. 11 shows a perspective view of a second fuel injector.
Figure 12:
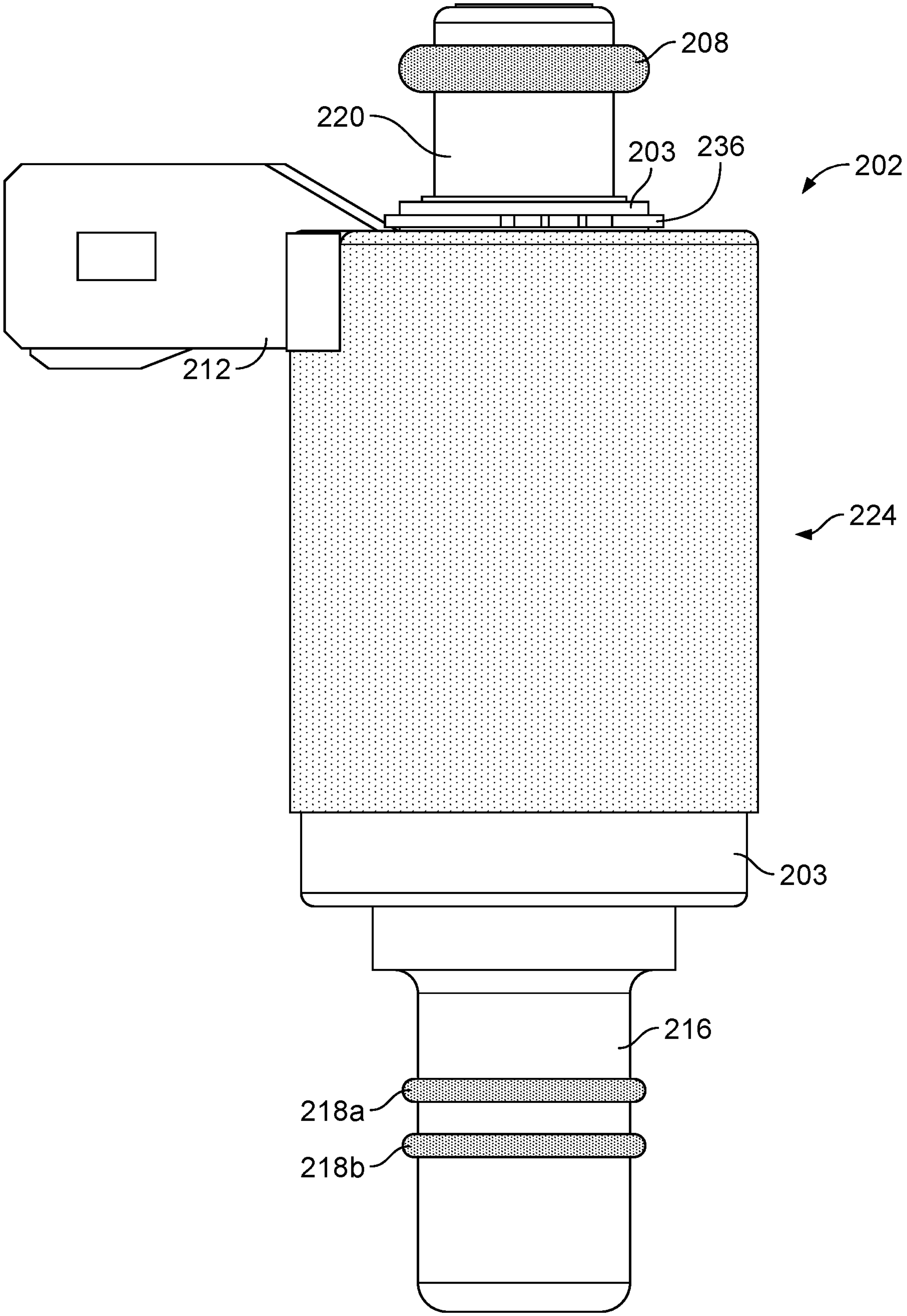
FIG. 12 shows a side view of the second fuel injector.
Figure 14:
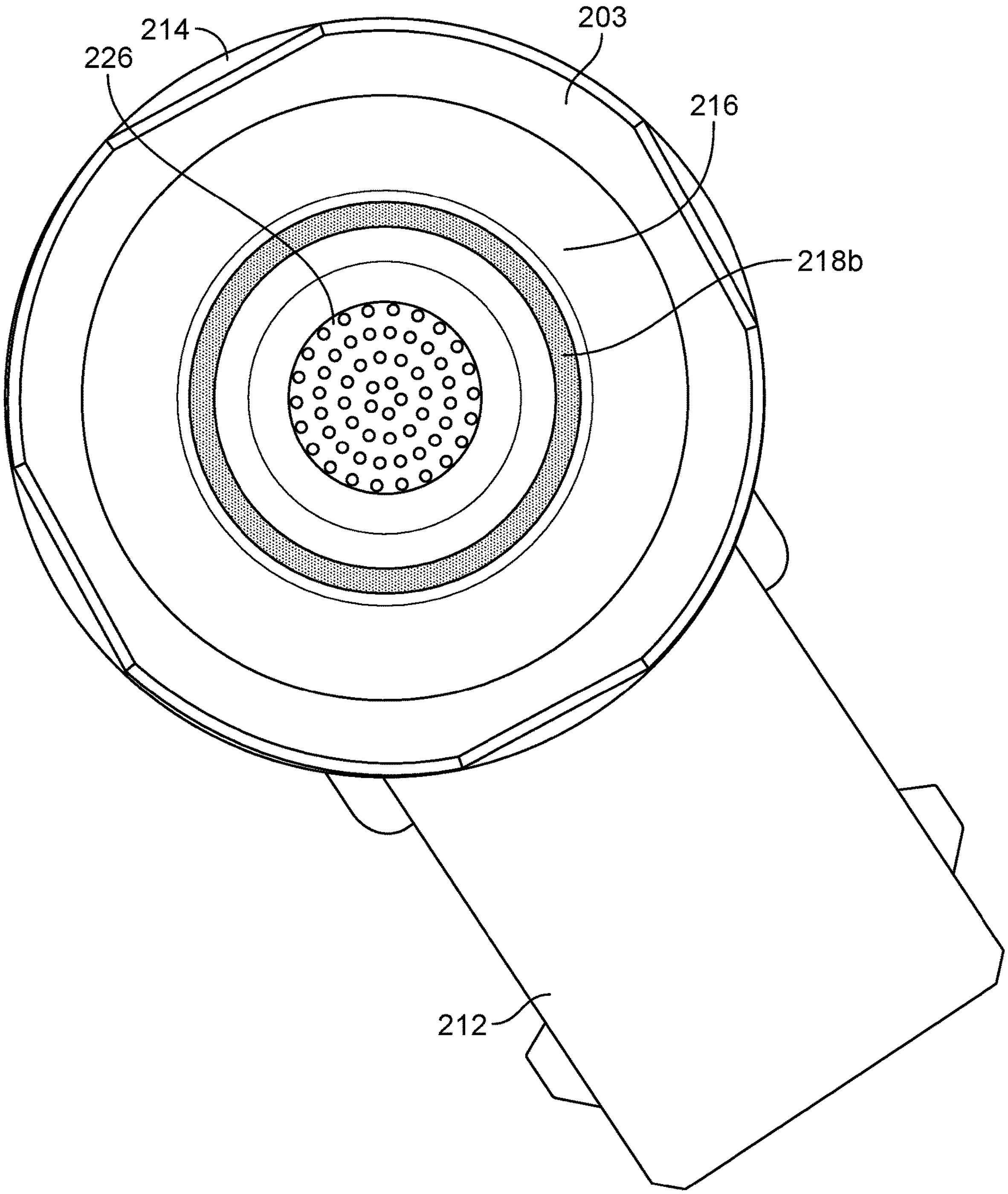
FIG. 14 shows a bottom view of the second fuel injector.
Figure 15:
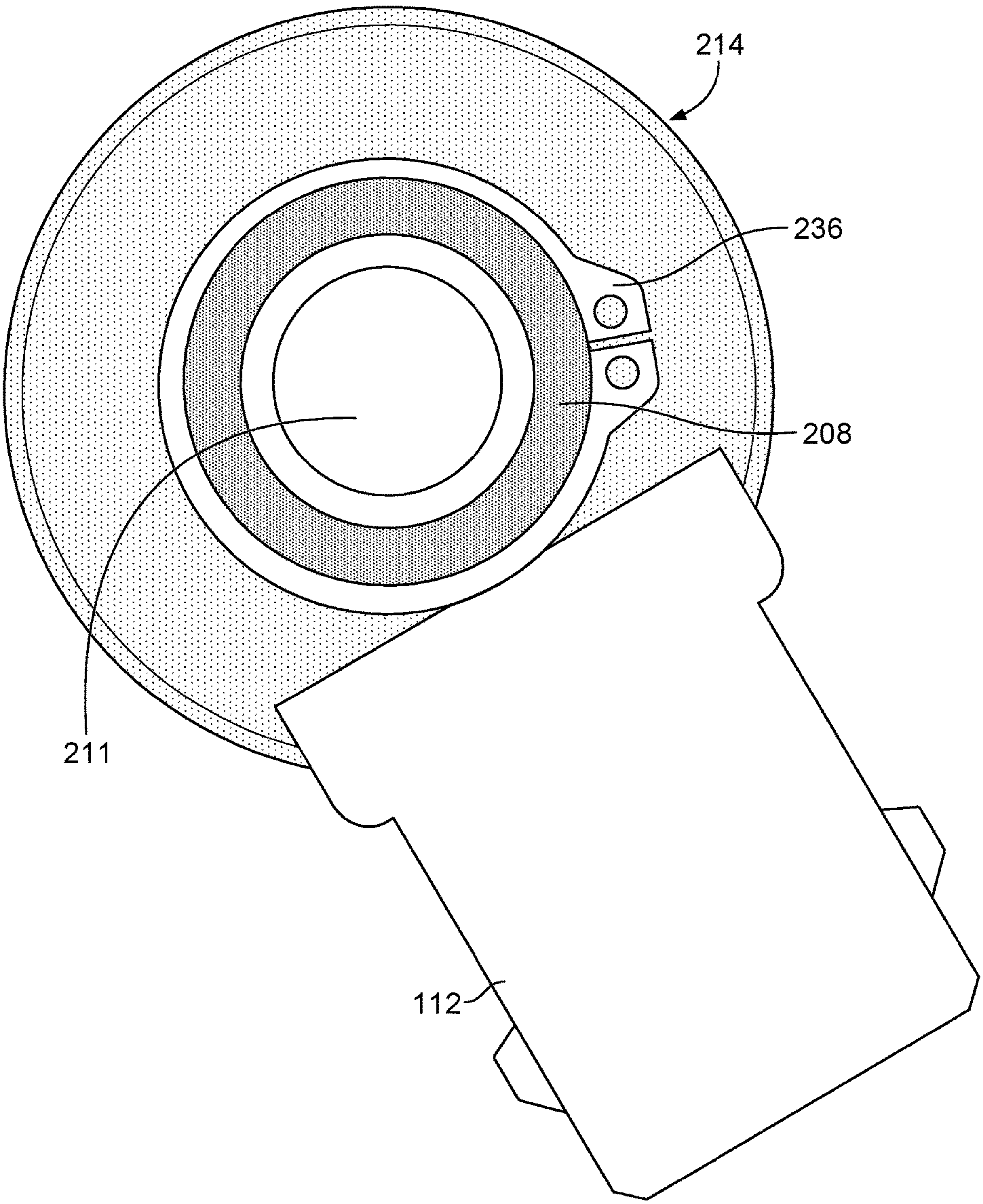
FIG. 15 shows a top view of the second fuel injector.

External views of a second fuel injector are provided in FIG. 11 (perspective view), FIG. 12 (side view), FIG. 14 (bottom view), and FIG. 15 (top view). Components of the second fuel injector that are externally visible include an upper housing portion 202 (which includes an upper housing inlet tube 220 and an upper housing body 203), a lower housing portion 216, a snap ring 236, a top O-ring 208, a coil assembly 214 (which includes an electrical connector 212), lower O-rings 218*a-b*, an atomization disc 226 (only visible externally in the bottom view of FIG. 14), and a fuel filter 211.

Figure 13:
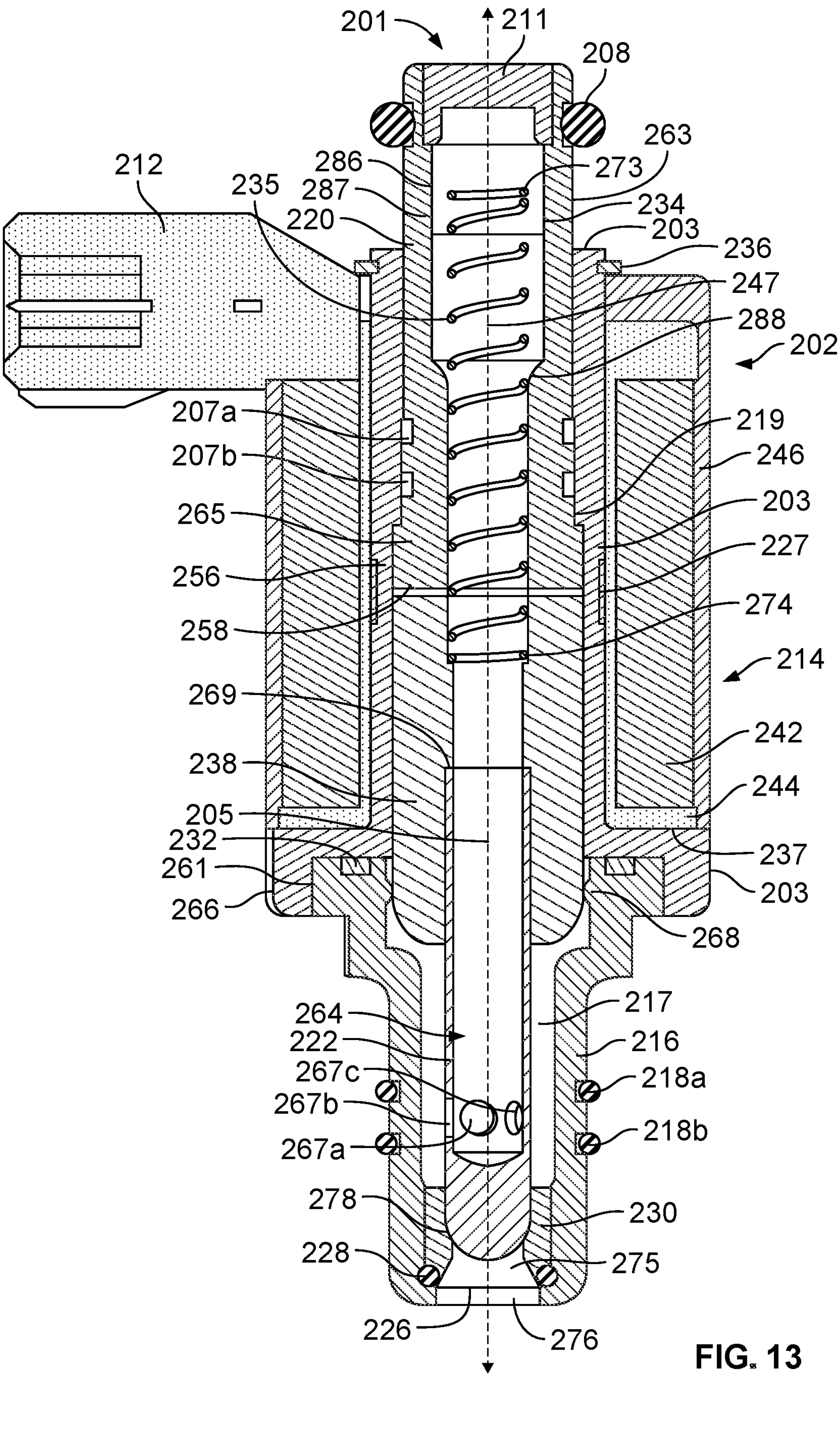
FIG. 13 shows a sectional side view of the second fuel injector.

A sectional side view of the second fuel injector is provided by FIG. 13. Components not already described as visible externally include a movable pintle 264, a valve-seat O-ring 228, a lower guide and valve seat component 230, a housing-sealing component 232 (e.g., an O-ring or a metal-sealing crush washer), a calibration insert 234, and a spring 235.

The movable pintle 264 includes multiple sub-components, including an armature 238 and a pin 222. The coil assembly 214 includes multiple sub-components, including a coil 242, a bobbin 244, coil overmolding 246, and an electrical connector 212.

Second Fuel Injector—Assembly

The lower housing portion 216 is removably attachable to the upper housing portion 202 by threading the components together using outward-facing threads 266 of the lower housing portion 216 and inward-facing threads 261 of upper housing body 203 component of the upper housing portion 202. The housing-sealing component 232 forms a seal between the lower housing portion 216 and the upper housing portion 202 when the housing portions are attached together, keeping pressured fuel from leaking out through the threads 261 and 266.

Prior to assembly of the lower housing portion 216 together with the upper housing portion 202, the upper housing inlet tube 220 (either with or without the calibration insert 234 having been threaded there into) is inserted from an underside of the upper housing portion 202 into the inlet passage 247 in the upper housing portion 202 (e.g., with the inlet passage being formed of a bore with sections having different diameters and threading at a middle section). The upper housing inlet tube 220 includes outward-facing threads 265 that engage inward-facing threads 256 of the upper housing body 203, enabling precise locating of the upper housing inlet tube 220 within the passage formed by the upper housing body 203.

The coil assembly 214 (with the integrated electrical connector 212) is slid down over a top of the upper housing portion 202 and retained in place with snap ring 236. The fuel filter 211 is installed into the upper opening of the inlet passage 247 that extends through the upper housing inlet tube 220, by pressing the fuel filter 211 into the upper opening of the inlet passage 247.

As described above, the movable pintle 264 includes an armature 238 and a pin 222, and is assembled by inserting the pin 222 into a bottom opening of a passage through the armature 238, until a top surface of the pin 222 abuts a bearing surface 269 of the armature 238. The bearing surface 269 may be a circumferential ledge that separates portions of the passage through the armature 238 that have different diameters. The pin 222 is retained within the armature 238 with a press fit.

Second Fuel Injector—Operation

The second fuel injector is attached to a component of an engine to direct fuel to a corresponding cylinder of the engine (e.g., through fuel injection into an intake manifold or through direct injection into the cylinder). Pressurized fuel is introduced into the second fuel injector through a fuel entrance 201 to the second fuel injector, at the fuel filter 211 that is located within the inlet passage 247.

The pressurized fuel continues through the second fuel injector by flowing through a center passage of the calibration insert 234, through a remainder of the inlet passage 247 of the upper housing inlet tube 220, and through a passage (e.g., a bore) that extends through the armature 238. The fuel continues into a passage (e.g. a bore) formed in pin 222. The passage in the pin 222 is a blind hole, such that the passage does not extend all the way through the pin 222. Rather, fuel flowing through the passage in the armature 238 and then into the passage in the pin 222 exits the pin 222 through three exit apertures 267*a-c*, which direct fuel from the passage in the pin 222 to an annular space between the pin 222 and a circumferential wall of the lower housing portion 216.

Fuel can also flow in comparatively reduced amounts around an exterior of the armature 238. Fuel may also be able to extend around an exterior of the upper housing inlet tube 220, being retained within an interior of the second fuel injector by O-rings 207*a-b*.

Figure 16:
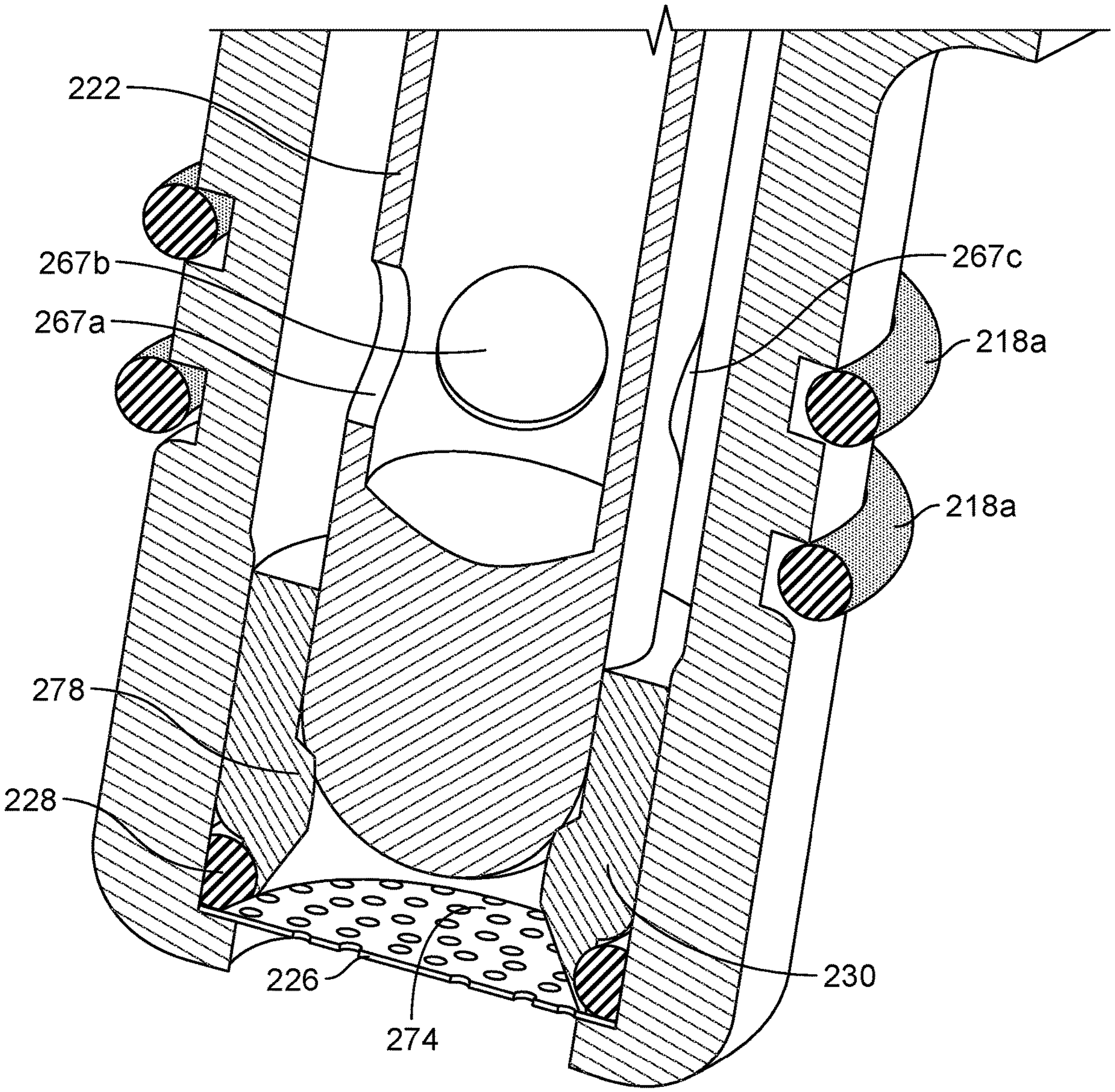
FIG. 16 shows a sectional perspective view of a bottom portion of the second fuel injector.
Figure 17A:
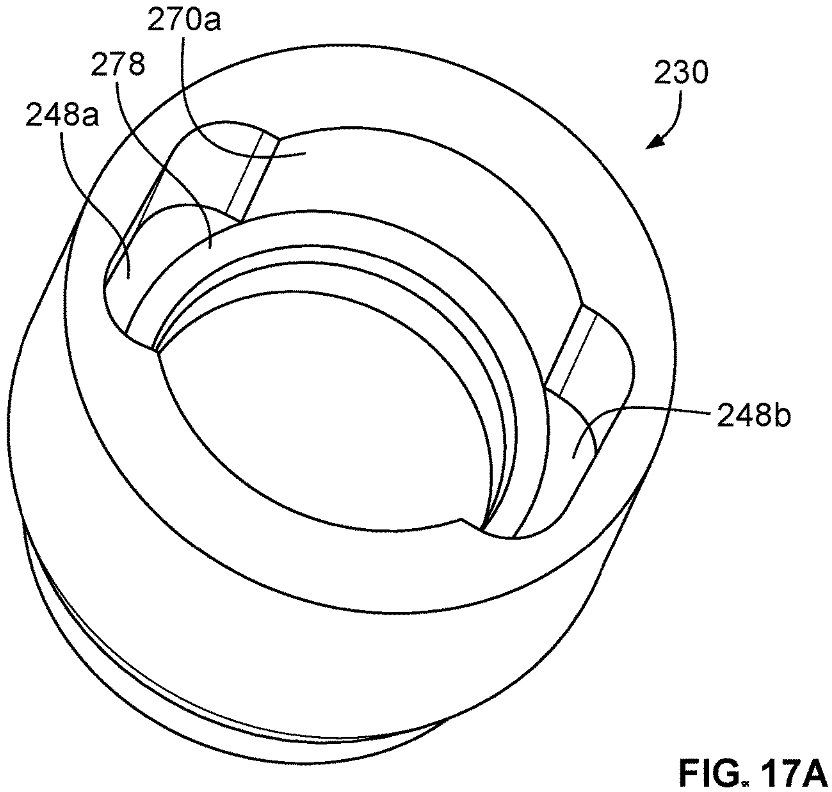
FIGS. 17A-C show various views of a lower guide and valve seat component of the second fuel injector.

As shown in FIG. 17A, the lower guide and valve seat component 230 includes two channels 248*a-b* through which fuel is allowed to flow partially past an outer periphery of a tip of the movable pintle 264. The pressurized fuel fills internal fuel injector spaces, including the channels 248*a-b* defined by the lower guide and valve seat component 230, but the pressurized fuel cannot flow completely past the tip of the movable pintle 264 due to contact between the tip of the movable pintle 264 and an annular sealing surface 278 of the lower guide and valve seat component 230 (shown best in FIG. 16). The movable pintle 264 is biased downward (thus maintaining a seal between the tip of the movable pintle 264 and the annular sealing surface 278) by the spring 235 that is located in compression between a spring-seating surface 273 of the calibration insert 234 and a spring-seating surface 274 of the armature 238.

The injector pulses fuel in response to an electric pulse that is received from an electronic control unit (ECU) and that is provided to the second fuel injector via electrical connector 212. The electrical connector 212 is electrically connected to the coil 242, energizing the coil 242 responsive to receipt of the electric pulse and forming a magnetic field. The magnetic field formed by the coil 242 provides a magnetic force that attracts the armature 238. As a result of the magnetic attraction, the movable pintle 264 is pulled upwards, overcoming the downward bias provided by the spring 235.

Movement of the movable pintle 264 upwards produces a gap between the tip of the pin 222 and the annular sealing surface 278. As such, pressurized fuel can flow past the tip of the pin 222 into the expansion region 275 (see FIGS. 13 and 16) and through atomization disc 226, which helps form the fuel into small droplets that pass through an injector outlet 276.

Once the electrical pulse ends, the magnetic field subsides and the spring 235 pushes the movable pintle 264 downward, interrupting fuel supply out of the end of the fuel injector.

Second Fuel Injector—Calibration and Repair

The distance between the spring-seating surface 273 of the calibration insert 234 and the spring-seating surface 274 of the armature 238, along with the type of spring located there between, affects the compressive spring force. The spring force affects the timing and dynamic speed at which the movable pintle 264 moves upward responsive to an attractive magnetic force (and correspondingly downward after the pulse ends). The spring force can be adjusted by inserting a tool through the inlet passage 247 and turning the calibration insert 234. The tool can access the calibration insert 234 with the fuel filter 211 removed, or with the lower housing portion 216 and the movable pintle 264 removed. As discussed previously, the calibration insert 234 is threaded into the inlet passage (e.g., bore) of the upper housing inlet tube 220. As such, turning the calibration insert 234 with the tool moves the calibration insert 234 up and/or down, enabling a user to modify the spring force imparted upon the armature 238 and therefore the rate at which the injector opens and closes.

The distance between the armature 238 and the upper housing inlet tube 220 (shown as the lift gap 258 in FIG. 13) affects the distance that that the movable pintle 264 moves upward. This distance corresponds to the size of the gap formed between the tip of the movable pintle 264 and the annular sealing surface 278, and therefore the amount of fuel that flows when the injector is fully open. The upper housing inlet tube 220 is threaded into the upper housing body 203 using outward-facing threads 265 of the upper housing inlet tube 220 and inward-facing threads 256 of the upper housing body 203. A user may turn the upper housing inlet tube 220 by gripping an outer surface 263 of the upper housing inlet tube 220, moving the upper housing inlet tube 220 up and/or down to change the size/length of the lift gap 258. In some examples, the outer surface 263 of the upper housing inlet tube 220 includes flats to receive a wrench to assist in turning the upper housing inlet tube 220.

The coil assembly 214 is external to the upper housing portion 202, and may be replaced while much of the fuel injector remains assembled. For example, the snap ring 236 may be removed, which allows the coil assembly 214 (with its integrated electrical connector 212) to be slid upwardly off the upper housing portion 202 (e.g., off a cylindrical peripheral surface of the upper housing body 203).

Comparison of First Fuel Injector and Second Fuel Injector

The first fuel injector (shown in FIGS. 1-10B) and the second fuel injector (shown in FIGS. 11-18B) are similar in many respects, and many components provide similar functionality in each respective fuel injector. Such components are similarly named and numbered, sharing the last two digits. For example, lower housing portion 216 of the second fuel injector provides functionality that is similar to that of the lower housing portion 116 of the first fuel injector, despite the components being shaped differently. Below is a discussion of some differences between the first fuel injector and the second fuel injector.

The second fuel injector includes the integrated fuel filter 211, while the first fuel injector is not shown with such a fuel filter. Still, the first fuel injector could be implemented with such an integrated fuel filter The second fuel injector is shown with an electrical connector 212 that receives a mating electrical connector with a push fit. The first fuel injector is shown with an electrical connector 112 that includes threads to receive a mating electrical connector with a screw-on action. Both fuel injectors may be implemented with either type of electrical connector (e.g., either a push-fit connector or a threaded connector).

The second fuel injector is shown with a thinned wall portion 227 in the upper housing portion 202. The thinned wall portion 227 may surround an entire circumference of the upper housing portion 202, such that the thinned wall portion 227 provides a thinned annular wall. The thinned wall portion 227 facilitates greater magnetic flux between the coil 242 and the armature 238 at a location of the thinned wall portion 227, with respect to portions of the upper housing portion 202 that do not include a thinned annular wall. Benefits of the thinned wall portion 227 include faster and stronger magnetic field saturation and faster release of eddy currents. The first fuel injector is not shown with a similar thinned wall portion, although such a thinned wall portion may be implemented in the first fuel injector.

In the second fuel injector, the spring 235 abuts the spring-seating surface 274 within the passage through the armature 238. In the first fuel injector, the spring-seating surface 174 of the armature is provided by a top surface of the armature 138. Both injectors can implement either design.

In the second fuel injector, the movable pintle 264 seals with the lower guide and valve seat component 230 using a tip of the pin 222. In the first fuel injector, the movable pintle 164 seals with the lower guide and valve seat component 130 using the ball 124. Both injectors can implement either design.

In the second fuel injector, the armature 238 and pin 222 of the movable pintle 264 are retained together with a press fit. In the first fuel injector, the armature 138 and the pin 122 of the movable pintle 164 are retained together by a compressive force retained by the cap 140. Both injectors can implement either design.

In the second fuel injector, fuel flows through a center bore in the armature 238 into a center bore in the pin 222, and out through the exit apertures 267*a-c*. In the first fuel injector, fuel flows into laterally-located intakes 170*a-d* and corresponding laterally-located passages through armature 138, before exiting into a region that surrounds the pin 122 (rather than going through the pin 122). Both injectors can implement either design.

In the second fuel injector, O-rings 207*a-b* keep fuel from flowing out of the top of the second fuel injector through the interface between the upper housing inlet tube 220 and the upper housing body 203. In the first fuel injector, a lip seal 106 keeps fuel from flowing out of the top of the first fuel injector through the interface between the upper housing inlet tube 120 and the upper housing body 103. Without a lip seal, the snap ring 236 of the second fuel injector bears down directly on the coil assembly 214 and retains the coil assembly 214 in place. In contrast, the snap ring 104 of the first fuel injector bears down on the lip seal 106, and a separate snap ring 136 retains the coil assembly 114 in place. Both injectors can implement either design.

In the second fuel injector, the overmolding 246 extends up over a top of the coil assembly 214. In the first fuel injector, the overmolding 146 extends only between upper and lower flanges of the bobbin 144. Both injectors can implement either design.

Discussion of Lower Guide and Valve Seat

The lower guide and value seat component 130 for the first fuel injector (see FIGS. 9 and 10A-B) is similar to the lower guide and valve seat component 230 for the second fuel injector (see FIGS. 16 and 17A-C). Aside from potential dimensional differences, the components share most (if not all) of the same features. As such, the following discussion focuses on the lower guide and valve seat component 230 for the second fuel injector, but the discussion also applies to the lower guide and valve seat component 130 for the first fuel injector.

The lower guide and valve seat component 230 for the second fuel injector is shown in various views in FIGS. 16 (sectional perspective view), 17A (perspective view), 17B (top view, with dimensions in mm), and 17C (sectional side view). The lower guide and valve seat component 230 has an outside periphery with a cylindrical shape, such that an outer surface of the lower guide and valve seat component 230 contacts a surface of the lower housing portion 216 that defines the passage (e.g., a bore) through the lower housing portion 216.

The lower guide and valve seat component 230 is shown as a unitary component, but the lower guide and the valve seat can be separate components. For example, an illustration of component 230 in FIG. 17C includes a first portion that provides a lower guide 271 and a second portion that provides a valve seat 272. These two portions can be integral with each other (as shown in the figures), physically separate components that abut each other when installed into a fuel injector, or physically separate components that are spaced apart from each other when installed in a fuel injector.

Any reference to a lower guide in this disclosure applies to a lower guide that is formed as a unitary component, that is formed integral with the valve seat portion, or that is formed integral with another component of the fuel injector. Similarly, any reference to a valve seat in this disclosure applies to a valve seat that is formed as a unitary component, that is formed integral with the lower guide, or that is formed integral with another component of the fuel injector.

The lower guide 271 centers a lower portion and tip of the movable pintle 264 within the pintle-receiving passage 217 that is defined by the lower housing portion 216, and guides the lower portion of the movable pintle 264 as the movable pintle 264 moves up and down between its closed and open positions. The lower guide 271 is shaped to form a fluid bearing that provides this centering and guiding functionality. For example, the lower guide 271 is formed so that inner surfaces 270*a-b* are spaced apart from the movable pintle 264 by a consistent distance, forming corresponding curved gaps. These curved gaps are sized to enable pressurized fuel that is located within internal spaces of the fuel injector to flow into the gaps. A width of the curved gaps, along a dimension transverse to a pintle-movement axis 205 that defines movement of the pintle 264 between the closed and open positions, is at least 7 microns, at least 12 microns, or at least 15 microns (within a range of lengths ending at any of 30 microns, 25 microns, 20 microns, and 16 microns).

The lower guide 271 produces the fluid bearing, at least partially, using pressured moving fuel to center the movable pintle 264. Using a fluid bearing minimizes or entirely reduces contact between the movable pintle 264 and the lower guide 271. The fluid bearing may generate no sliding friction, lower overall friction, lower wear on components, and lower vibration than different types of pintle guides. When not moving and in the closed position, the movable pintle 264 may be centered through contact between a convex shape of a tip of the movable pintle 264 and the annular sealing surface 278 of the valve seat 272.

To provide the fluid bearing, the inner surfaces 270*a-b* have lengths, parallel to the pintle-movement axis 205, that are at least two orders of magnitude longer than the width of the curved gaps. For example, lengths of the inner surfaces 270*a-b* between a top of the lower guide 271 and a bottom of the lower guide 271 (roughly corresponding to a length of the double-ended arrow accompanying identifier 271 in FIG. 17C) is at least 1 mm, at least 2 mm, at least 3 mm, or at least 4 mm (within a range of lengths ending at any of 8 mm, 7 mm, 6 mm, 5 mm, 4 mm, 3 mm, and 2 mm).

The inner surfaces 270*a-b* are straight in directions parallel to the pintle-movement axis, such that the curved gaps between the inner surfaces 270*a-b* and the movable pintle 264 remain consistent at different positions along the lengths of the inner surfaces 270*a-b* (e.g., with "consistent" here meaning the same width within tolerances of precision production machinery).

An upper guide 268 centers an upper portion of the movable pintle 264 within the pintle-receiving passage 217. The upper guide 268 includes a convex, annular protrusion that extends outward from an inner surface of the lower housing portion 216. As such, the upper guide 268 is differently structured in comparison to the lower guide 271. For example, a gap between the upper guide 268 and the armature 238 portion of the movable pintle 264 is smaller than the gap between the lower guide 271 and the movable pintle 264. For example, the gap at the upper guide 268 may be at least 3 microns, 5 microns, 7 microns, 12 microns, or 15 microns (within a range of lengths ending at any of 20 microns, 16 microns, 13 microns, 11 microns, 9 microns, 6 microns, and 4 microns). As such, the gap at the upper guide 268 may be smaller than the gap at the lower guide 271.

The gap between the upper guide 268 and the movable pintle 264 is consistent in width and completely surrounds and entire circumference of the movable-pintle axis 205. This is in distinction to the gaps between the inner surfaces 270*a-b* of the lower guide 271 and the movable pintle 264, which are interrupted by the fuel channels 248*a-b* (discussed in additional detail below).

A surface of the upper guide 268 that is nearest to the movable pintle 264 has a length along (e.g., in a direction parallel to) the pintle-movement axis 205 that approaches zero, due to the inner-facing surface of the upper guide 268 being convex/rounded at its innermost portion. As such, the surface of the upper guide 268 is not straight for any discernable length in directions parallel to the pintle-movement axis 205. The upper guide 268 is illustrated in FIG. 13 as being integral with a wall of the lower housing portion 216, but the upper guide 268 may be provided by a component that is separate from the lower housing portion 216 and that is inserted into the pintle-receiving passage 217 (e.g., seating on an annular ledge provided by the lower housing portion 216 within the pintle-receiving passage 217).

As mentioned above, the inner surfaces 270*a-b* are separated from each other by the fuel channels 248*a-b*. The fuel channels 248*a-b* provide cavities that are filled with pressured fuel when the movable pintle 264 is in the closed position, to locate amounts of fuel sufficiently close to the annular sealing surface 278 at multiple different locations when the movable pintle 264 is in the closed position. The presence of fuel in the fuel channels 248*a-b* provides immediate fuel delivery once the movable pintle 264 begins moving to the open position. A size of the fuel channels 248*a-b* in a plane transverse to the pintle-movement axis 205 is arranged to provide high levels of fuel flow when the movable pintle is in the open position.

Figure 17B:
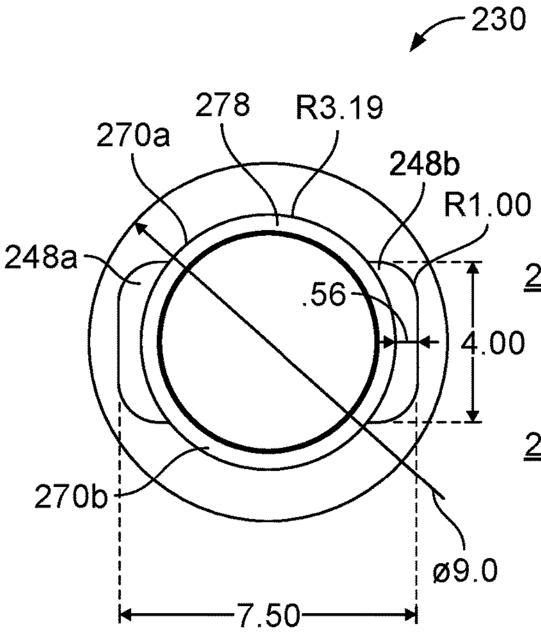

As shown best by the top view of FIG. 17B, the fuel channels 248*a-b* are defined by inward-facing surfaces of the lower guide 271 that are generally concave, although they are illustrated in the figures as having straight middle sections that provide flat channel bottoms. The figures show two fuel channels 248*a-b* that are separate by two inner walls 270*a-b*, but the lower guide 271 may be implemented with a single fuel channel or more than two fuel channels (e.g., three, four, five, or six fuel channels, with inner walls there between working together to provide the fluid bearing for the movable pintle 264).

The figures show that the fuel channels 248*a-b* do not extend all the way through the lower guide and valve seat component 230. Rather, the fuel channels end at the valve seat 272 to direct fuel inward to the annular sealing surface 278. In implementations in which the lower guide 271 is spaced apart from the valve seat 272, the fuel channels 248 may extend entirely through a component that provides the lower guide 271.

Figure 17C:
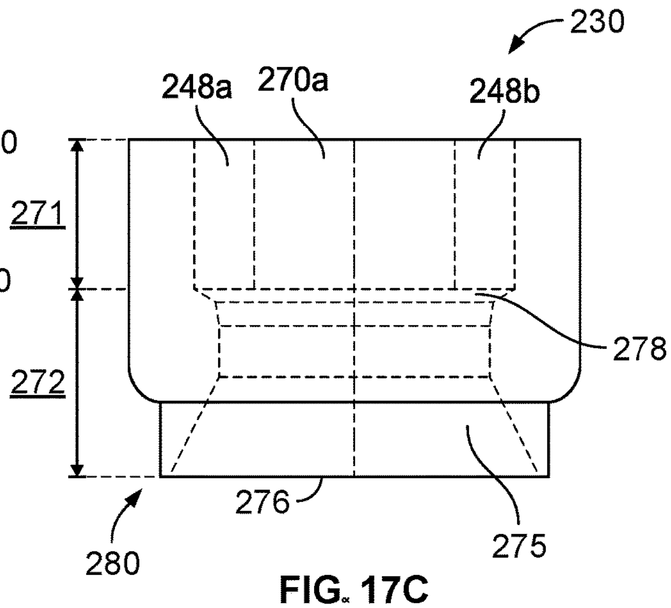

The valve seat 272 provides the annular sealing surface 278 against which the movable pintle 264 seats in the closed position, to prevent the pressurized fuel from flowing through the injector outlet. The annular sealing surface 278 is shown in FIG. 17C as an angled surface that is straight along the angle, but the annular sealing surface 278 may have a slight concavity to match a convexity of a tip of the movable pintle 264, such that both curved surfaces engage along a width of at least 0.1 mm, 0.3 mm, 0.5 mm, or 0.8 mm (and within a range of widths ending at any of 1.0 mm, 0.8 mm, 0.6 mm, 0.4 mm, 0.2 mm) along a direction transverse to the pintle-movement axis 205. The valve seat 272 may be formed of stainless steel. The concavity may be formed by a cold forging "coining" process in which a convex die is stamped into the valve seat 272 to change the annular sealing surface 278 from having the straight angled surface shown in FIG. 17C to having an annular convexity that matches the tip of the movable pintle 264.

The valve seat 272 defines, below the annular sealing surface 278, a bore having a consistent width, which leads to an expansion region 275 that enables fuel to expand before the fuel encounters and passes through the atomization disc 226 (see FIGS. 13 and 16).

The valve seat 272 is press fit into a bore defined by the lower housing portion 216, such that the bore has a slight taper and narrows as the bore approaches a bottom end of the lower housing portion 216. Although an outer periphery of the valve seat 272 has a cylindrical shape (potentially with a modest taper to match taper of the bore in the lower housing portion 216), a bottom portion of the periphery of the valve seat 272 defines a recess 280 to receive an O-ring 228. The O-ring 228 prevents fuel that may pass into an interface between the outer periphery of the valve seat 272 and the bore of the lower housing portion 216 from leaking out of the fuel injector.

As additional description to the embodiments described above, the present disclosure describes the following embodiments.

Embodiment 1 is a fuel injector, comprising: an upper housing portion that defines an inlet passage adapted to receive fuel; a lower housing portion that defines a pintle-receiving cavity and an injector outlet that is adapted to dispense fuel; an electromagnetic coil assembly; a movable pintle that is: (i) located in the pintle-receiving cavity of the lower housing portion; (ii) biased to a closed position that is adapted to prevent fuel from flowing through the injector outlet, and (iii) movable, responsive to magnetic force produced by energizing the electromagnetic coil assembly, to an open position that is adapted to permit fuel to flow through the injector outlet; and a guide that is: (i) adapted to guide the movable pintle within the pintle-receiving cavity; (ii) sized to be spaced apart from the movable pintle during pintle movement and provide a fluid bearing for the movable pintle during pintle movement.

Embodiment 2 is the fuel injector of embodiment 1, wherein: a direction in which the movable pintle is adapted to move between the closed position and the open position defines a pintle-movement axis; and the guide defines a first inner surface that is: (i) curved about the pintle-movement axis, and (ii) straight in directions parallel to the pintle-movement axis.

Embodiment 3 is the fuel injector of embodiment 2, wherein: the guide defines a second inner surface that is: (i) curved about the pintle-movement axis, and (ii) straight in directions parallel to the pintle-movement axis; the first inner surface only partially surrounds the pintle-movement axis; and the second inner surface only partially surrounds the pintle-movement axis.

Embodiment 4 is the fuel injector of embodiment 3, wherein: the guide defines a first fuel channel that separates the first inner surface from the second inner surface at a first location; and the guide defines a second fuel channel that separates the first inner surface from the second inner surface at a second location that is different from the first location.

Embodiment 5 is the fuel injector of embodiment 4, wherein: the fuel injector comprises a valve seat that provides an annular seating surface adapted to receive an end of the moveable pintle when the movable pintle is in the closed position; and the first fuel channel and the second fuel channel are shaped to each provide fuel to the valve seat at different portions of the valve seat.

Embodiment 6 is the fuel injector of embodiment 1, wherein: a direction in which the movable pintle is adapted to move between the closed position and the open position defines a pintle-movement axis; the guide defines a first inner surface that: (i) is curved about the pintle-movement axis, and (ii) has a length of at least 1 mm along a direction aligned with the pintle-movement axis.

Embodiment 7 is the fuel injector of embodiment 6, wherein: the first inner surface has a length of at least 2.5 mm along the direction aligned with the pintle-movement axis.

Embodiment 8 is the fuel injector of any one of embodiments 6-7, wherein: the first inner surface is spaced apart from an outer surface of the pintle by a consistent distance as a result of the outer surface of the pintle also being curved about the pintle-movement axis.

Embodiment 9 is the fuel injector of any one of embodiments 1-8, wherein: the fuel injector comprises a valve seat that provides an annular seating surface adapted to receive an end of the moveable pintle when the movable pintle is in the closed position.

Embodiment 10 is the fuel injector of embodiment 9, wherein: the guide and valve seat are provided by a unitary structure; and the unitary structure is a distinct from the lower housing portion.

Embodiment 11 is the fuel injector of any one of embodiments 9-10, wherein: an outer surface of the guide defines a cylinder shape; and the guide fits within the pintle-receiving cavity of the lower housing portion, with the outer surface of the guide contacting a surface of the lower housing portion that defines the pintle-receiving passage.

Embodiment 12 is the fuel injector of any one of embodiments 9-11, wherein: an end of the moveable pintle is adapted to contact the valve seat at the annular seating surface of the valve seat; the end of the movable pintle has a convex shape; and the annular seating surface defines a concave shape adapted to receive the end of the movable pintle.

Embodiment 13 is the fuel injector of any one of embodiments 1-12, wherein: the guide is a lower guide adapted to guide a lower portion of the movable pintle within the pintle-receiving passage; and the fuel injector defines an upper guide that is adapted to guide an upper portion of the movable pintle within the pintle-receiving passage.

Embodiment 14 is the fuel injector of embodiment 13, wherein: the lower guide is provided by a component that is distinct from the lower housing portion; and the upper guide is provided by an integral portion of the lower housing portion.

Embodiment 15 is the fuel injector of any one of embodiments 13-14, wherein: a direction in which the movable pintle is adapted to move between the closed position and the open position defines a pintle-movement axis; and the upper guide comprises annular protrusion into the pintle-receiving passage, an inner surface of the annular protrusion defining a convex shape that is curved about the pintle-movement axis.

Embodiment 16 is the fuel injector of any one of embodiments 1-15, wherein: a gap of at least seven microns is present between the guide and the movable pintle to provide the fluid bearing using fuel received into the fuel injector through the inlet passage.

Embodiment 17 is the fuel injector of embodiment 16, wherein: the guide surrounds the movable pintle; and the gap is a circumferential gap between the guide and the movable pintle.

Embodiment 18 is the fuel injector of any one of embodiments 16-17, wherein the gap is at least twelve microns.

Discussion of Fuel Filter

Figure 18A:
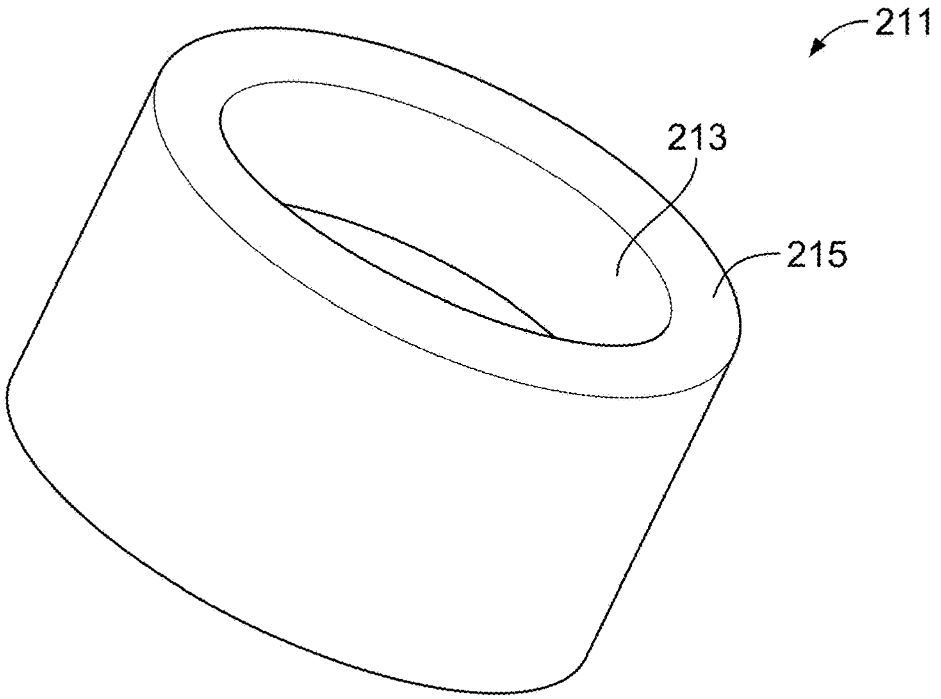
FIGS. 18A-B show various views of a fuel filter of the second fuel injector.
Figure 18B:
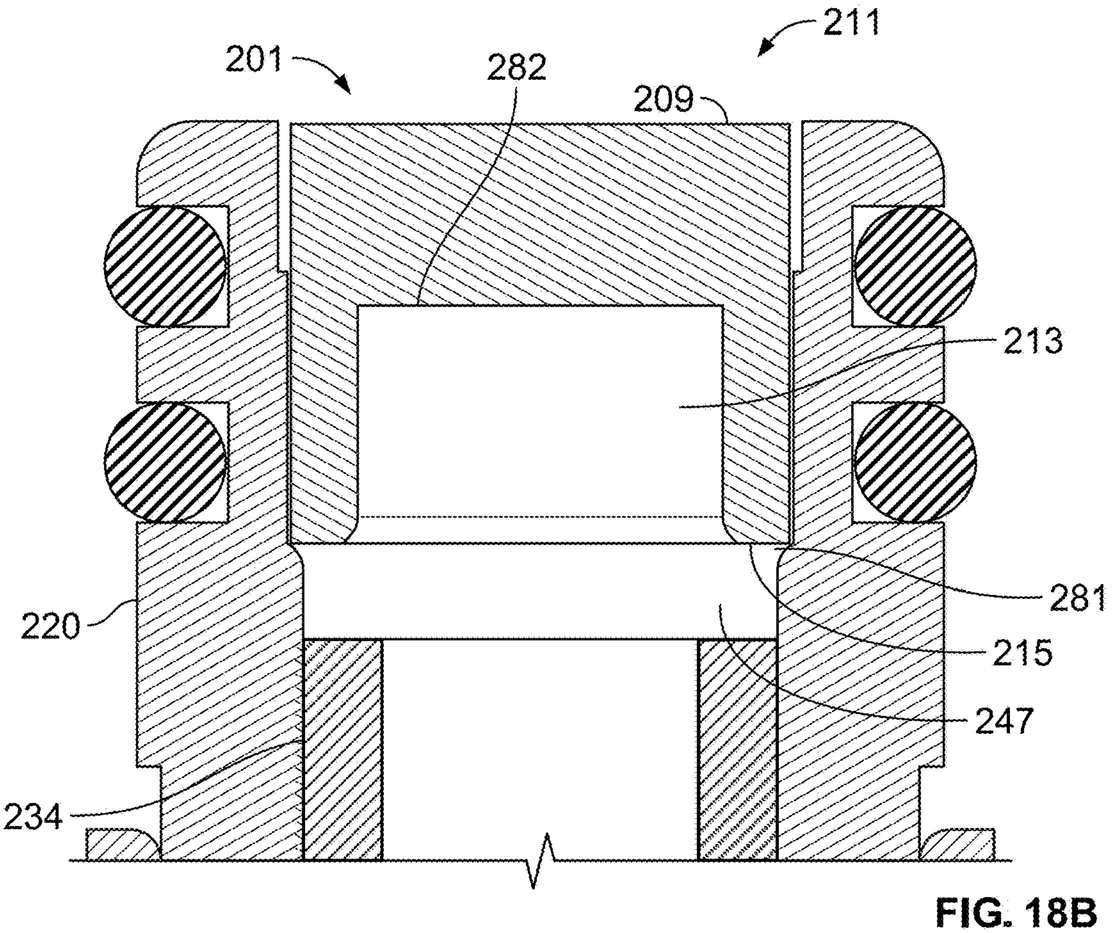

The second fuel injector is shown with a fuel filter 211 located within an upper portion of the inlet passage 247. External views of the second fuel injector in which an end portion of the fuel filter 211 is visible are provided by FIGS. 11 (perspective view) and 15 (top view). Sectional side views of the second fuel injector with the fuel filter 211 installed therein are provided by FIG. 13 (sectional view of entire injector) and 18B (sectional view of only top portion of injector). FIG. 18A provides a perspective view of the fuel filter 211 by itself.

The fuel filter 211 provides fuel filtering functionality that is integrated with the second fuel injector, although the first fuel injector can also incorporate the fuel filter 211. Absent the fuel filter 211, contaminants in fuel flowing through the fuel injector can lodge between the movable pintle 264 and the annular sealing surface 278, preventing the movable pintle 264 from seating fully against the annular sealing surface 278 and therefore remaining in a partially-open position. Fuel may continuously flow from the injector in such a scenario, resulting in potentially catastrophic engine damage, which is costly and potentially dangerous to individuals near the engine. Contaminants can also lodge between the upper guide 268 and the movable pintle 264, and between the lower guide 271 and the movable pintle 264, causing damage to internal components and/or locking the injector at least partially open.

A fuel filter is typically installed between a fuel pump and fuel passages (e.g., a fuel rail) that delivers fuel to multiple fuel injectors. Such a fuel filter may provide filtration at a 10 micron level. Still, such a pre-injector fuel filter does not eliminate all contamination concerns. For example, any maintenance on fuel passages that are located after the fuel pump filter can produce contaminants that may enter a fuel injector if the fuel passages are not properly flushed of contaminants after maintenance. Also, contaminants that are smaller than 10 microns (and therefore not filtered out by the fuel pump filter) can gather in corners and recesses of the fuel passages and aggregate into larger particles that can dislodge and damage an injector.

The fuel filter 211 can reduce hazards caused by contaminants that remain in fuel that reaches the fuel injector. The fuel filter 211 may be located within a top portion of the inlet passage 247, and may be installed by pressing the fuel filter 211 into the inlet passage 247 through the fuel entrance 201.

The fuel filter 211 may have a cylindrical outer wall, such that a peripheral surface of the outer wall of the fuel filter 211 contacts an inner surface of the upper housing inlet tube 220 that defines the inlet passage 247. The fuel filter 211 may be press fit into the inlet passage. The fuel filter 211 may seat on a ledge 281 defined by the inner surface of the upper housing inlet tube 220, which prevents movement of the fuel filter 211 further into the inlet passage 247. The ledge 281 may be annular ledge that completely surrounds a center axis of the inlet passage 247 (e.g., with the center axis being co-axial with the pintle-movement axis 205). The ledge 281 may separate a first portion of the inlet passage 247 that has a first diameter from a second portion of the inlet passage 247 that has a second diameter that is less than the first diameter, to provide a step decrease in diameter of the inlet passage 247 (e.g., with the ledge 281 including a slope and not providing an exact 90-degree step).

The fuel filter 211 may be formed of a rigid material, for example, a pressure-formed sintered stainless steel metal material that is adapted to filter contaminants from fluids. The sintering process may be performed on a stainless steel felt to produce at least hundreds (if not thousands) of spaces between stainless steel threads pressed together under pressure and/or heat during a sintering process.

The fuel filter 211 may not be rated to filter contaminants as small as those that the pre-injector filter is able to filter. For example the fuel filter 211 may be rated no lower than 70 microns, 80 microns, 100 microns, 150 microns, 200 microns, or 300 microns (within a range ending at any of any of 500 microns, 400 microns, 350 microns, 250 microns, and 125 microns). As such, the fuel pump filter may perform much of the fuel filtration, with the injector-integrated and retained fuel filter 211 providing filtration of relatively-fewer contaminants that may be present in fuel that reaches the fuel injector.

The rigid nature of the fuel filter 211 enables the fuel filter 211 to be cleaned. For example, a user can disassemble the lower housing portion 216 of the injector from the upper housing portion 202, remove the movable pintle 264, and then either: (1) flush a cleaning solution up through the inlet passage 247 in a reverse direction of fuel flow while the fuel filter 211 remains within the inlet passage 247; or (2) insert an instrument up through the inlet passage 247 in the reverse direction of fuel flow to dislodge the fuel filter 211 for cleaning while separated from the fuel injector, or for replacement with another fuel filter.

As described elsewhere in this disclosure, a user can adjust the position of the calibration insert 234, while the upper housing portion 102 and the lower housing portion 116 remain assembled together, to calibrate a spring force applied to the movable pintle 264. This adjustment may be performed while the fuel filter 211 is not installed into the injector. To limit an affect that the fuel filter has on fuel flow rates through the injector after the fuel filter 211 has been installed (e.g., after the injector has been calibrated to produce certain fuel flow characteristics), the fuel filter 211 can be designed to provide a fluid resistance that is less than a fluid resistance provided by the calibration insert 234 and/or other fuel passages that follow the filter 211 in a path of fuel flow through the injector. For example, an area of a top surface 209 of the fuel filter 211 may be greater than an area of an opening to the passage through the calibration insert 234. In this example, the top surface 209 of the fuel filter 211 is flush with a top surface of the upper housing inlet tube 220 and therefore the fuel entrance 201. The top surface 209 of the fuel filter 211 is proximate the fuel entrance 201, while the bottom surface 282 is distal the fuel entrance 201.

To provide additional surface area for fuel to exit the fuel filter 211, a bottom surface 282 of the fuel filter 211 can have a non-planar shape. For example, the bottom surface 282 of the fuel filter 211 defines a cavity 213 into which filtered fuel can flow after existing the fuel filter 211. The fuel filter 211 includes a peripheral side that has a circular wall portion 215 that seats against the ledge 281 of the upper housing inlet tube 220. The circular wall portion 215 defines side walls of the cavity 213, such that part of the bottom surface 282 that defines an end of the circular wall portion 215 is a part of the fuel filter 211 that is closest to the calibration insert 234. A central, flat portion of the bottom surface 282 is a part of the bottom surface 282 that is furthest from the calibration insert 234. The presence of the cavity 213 and the presence of a space between the circular wall portion 215 and the calibration insert 234 enables filtered fuel to collect before flowing into the bore through the calibration insert 234, which can reduce a turbulence of fuel flowing through the calibration insert 234 and increase a maximum overall fuel flow rate.

Figure 19A:
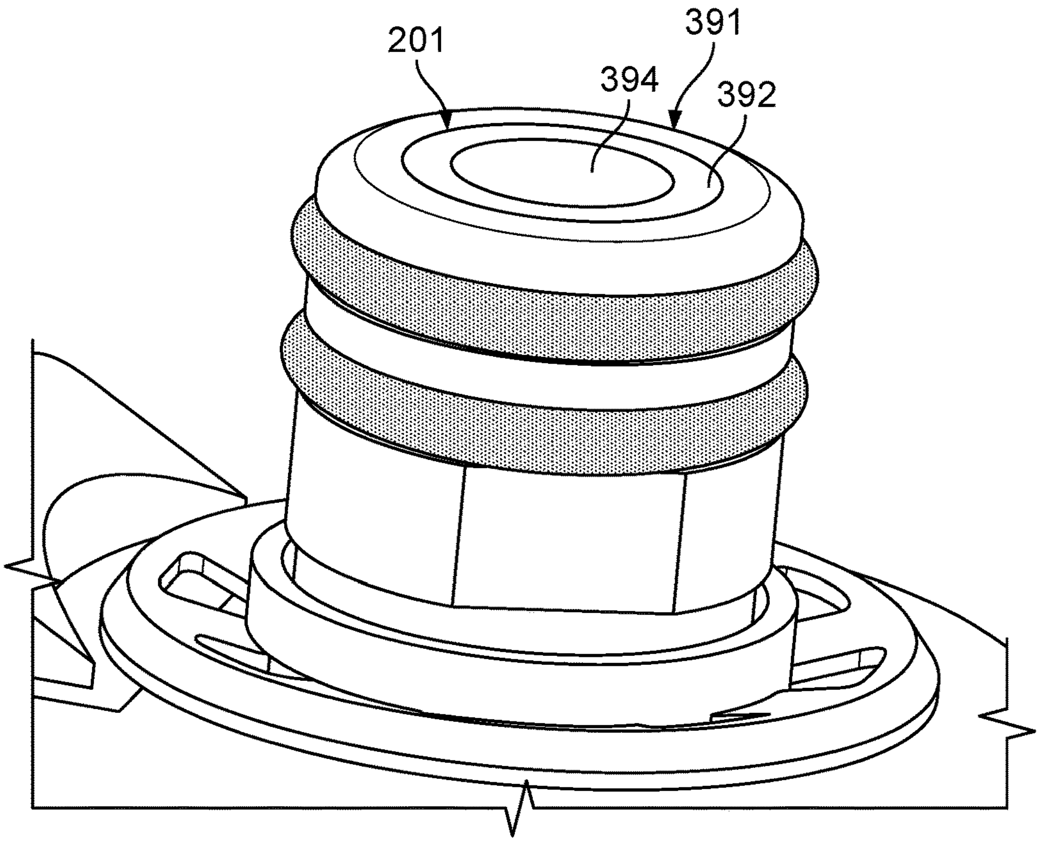
FIGS. 19A-B show various views of an alternative fuel filter.
Figure 19B:
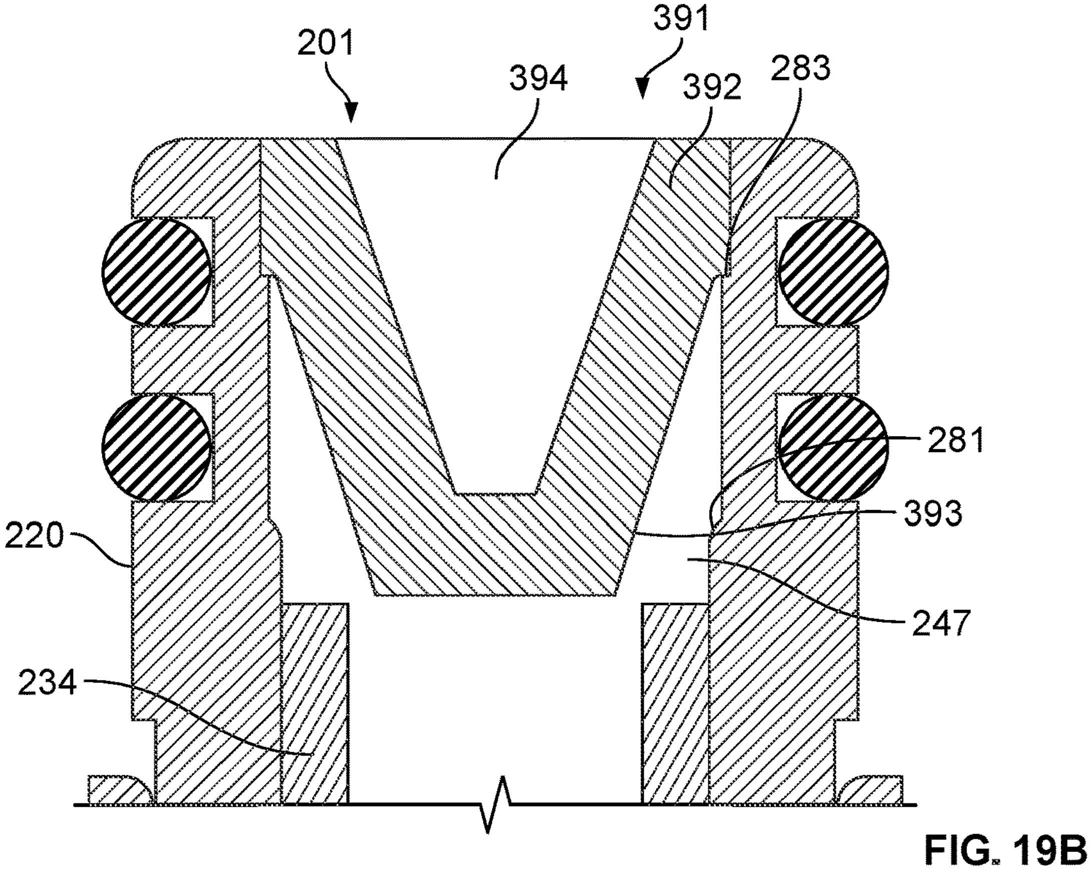

FIGS. 19A-B show an alternative fuel filter 391 that is formed of the same material as the fuel filter 211, and that can be installed in the first fuel injector or the second fuel injector. The alternative fuel filter 391 is located in the inlet passage 247 at generally a same location as the fuel filter 211. Still, a shape of the alternative fuel filter 391 is different from that of the fuel filter 211, such that the alternative fuel filter 391 seats on ledge 283 rather than ledge 281. While the alternative fuel filter 391 defines a cavity 394, like fuel filter 211, the cavity 394 in the alternative fuel filter 391 is defined by a top surface 392 of the alternative fuel filter 391 rather than a bottom surface (as with the fuel filter 211).

The presence of the cavity 394 increases a surface area of the top surface 392, in comparison to the flat top surface 209 of the fuel filter 211, which reduces fluid resistance provided by the alternative fuel filter 391. The presence of the cavity 394 results in a center portion of the top surface 392 being a portion of the top surface 392 that is furthest from the fuel entrance 201.

A bottom surface 393 of the alternative fuel filter 391 defines a protrusion that extends away from the fuel entrance 201, resulting in the bottom surface 393 providing more surface area than had the bottom surface 393 been entirely planar. The protrusion results in a center portion of the bottom surface 393 being a portion of the alternative fuel filter 391 that extends furthest into the inlet passage 247 and away from the fuel entrance 201.

As additional description to the embodiments described above, the present disclosure describes the following embodiments.

Embodiment 1 is a fuel injector, comprising: an upper housing portion that defines an inlet passage adapted to receive fuel; a lower housing portion that defines an injector outlet adapted to dispense fuel; an electromagnetic coil assembly; a movable pintle that is: (i) biased to a closed position that is adapted to prevent fuel from flowing through the injector outlet, and (ii) movable, responsive to magnetic force produced by energizing the electromagnetic coil assembly, to an open position that is adapted to permit fuel to flow through the injector outlet; and a fuel filter located within the inlet passage of the upper housing portion to filter contaminants from fuel, the fuel filter including a top surface located proximal a fuel entrance to the inlet passage and a bottom surface located distal the entrance to the inlet passage.

Embodiment 2 is the fuel injector of embodiment 1, wherein: the upper housing portion defines a ledge within the inlet passage; the ledge is offset from the fuel entrance and adapted to locate the fuel filter within the inlet passage; and the fuel filter seats on the ledge.

Embodiment 3 is the fuel injector of embodiment 2, wherein: the inlet passage comprises an inlet bore that is defined by the upper housing portion and that extends completely through the upper housing portion; the ledge comprises a circular ledge located at a periphery of the inlet bore; and the filter defines a cylindrical shape with an outer wall adapted to contact the periphery of the inlet bore.

Embodiment 4 is the fuel injector of embodiment 3, wherein: a first portion of the inlet bore, located to a first side of the circular ledge proximal the fuel entrance to the inlet passage, has a first diameter; and a second portion of the inlet bore, located to a second side of the circular ledge distal the fuel entrance to the inlet passage, has a second diameter that is smaller than the first diameter, such that the circular ledge provides a step decrease in diameter of the inlet bore.

Embodiment 5 is the fuel injector of any one of embodiments 2-4, wherein; the lower housing portion is removably coupled to the upper housing portion using a threaded connection; the fuel filter is removably located within the inlet passage; and the fuel injector is adapted to permit user removal of the fuel filter by: (i) unthreading the lower housing portion and the upper housing portion from each other to expose a fuel exit from the inlet passage, the fuel exit from the inlet passage being defined by the upper housing portion; and (ii) inserting an instrument into the exit to the inlet passage to push the fuel filter through the fuel entrance to the inlet passage.

Embodiment 6 is the fuel injector of any one of embodiments 1-5, wherein: the fuel filter comprises stainless steel components; and pores of the fuel filter are defined by hundreds of spaces between the stainless steel components.

Embodiment 7 is the fuel injector of any one of embodiments 1-6, wherein: the fuel injector comprises sintered metal that defines pores of the fuel filter between portions of metal that have been bonded under heat to form the sintered metal.

Embodiment 8 is the fuel injector of embodiment 7, wherein: the sintered metal comprises a stainless steel sintered metal felt structure.

Embodiment 9 is the fuel injector of any one of embodiments 7-8, wherein: the fuel filter provides a micron filtration rating no lower than 80 microns.

Embodiment 10 is the fuel injector of any one of embodiments 1-9, wherein: the fuel injector comprises a calibration insert located within the inlet passage after the fuel filter in a direction of fuel flow through the fuel injector; the calibration insert defines a calibration insert fuel passage through the calibration insert; a first surface area of the top surface of the fuel filter is greater than an area defined by an opening to the fuel passage; and a second surface area of the bottom surface to the filter is greater than the area defined by the opening to the fuel passage.

Embodiment 11 is the fuel injector of embodiment 10, wherein: the fuel injector comprises a spring that is adapted to impart a force to the movable pintle; the calibration insert provides a spring seating surface onto which the spring seats; the calibration insert is movable to calibrate the force imparted by the spring to the movable pintle; and the spring is positioned within the inlet passage of the upper housing portion so that fuel exiting the calibration insert fuel passage continues through a center of the spring.

Embodiment 12 is the fuel injector of any one of embodiments 10-11, wherein: a portion of the bottom surface of the fuel filter that is collinear with the opening to the calibration insert fuel passage both (i) defines a circular shape, and (ii) is offset from the opening to the calibration insert fuel passage.

Embodiment 13 is the fuel injector of any one of embodiments 1-12, wherein: the bottom surface of the fuel filter defines a exit cavity in the fuel filter, such that a central portion of the exit cavity is positioned closer to the fuel entrance to the injector inlet than a periphery of the fuel filter that defines a peripheral side off the central cavity.

Embodiment 14 is the fuel injector of embodiment 13, wherein: the exit cavity in the fuel filter is centrally located within the fuel filter, such that a center of the exit cavity is collinear with a center of the fuel entrance to the inlet passage.

Embodiment 15 is the fuel injector of embodiment 14, wherein: the inlet passage comprises an inlet bore that is defined by the upper housing portion and that extends through the upper housing portion; the peripheral side to the exit cavity in the fuel filter comprises a circular wall portion of the fuel filter that surrounds the exit cavity; and the circular wall portion of the fuel filter seats on a ledge that is defined by the upper housing portion within the inlet passage.

Embodiment 16 is the fuel injector of any one of embodiments 1-11, wherein: the top surface of the fuel filter defines a cavity that extends into the inlet passage in a direction of fuel flow through the fuel injector.

Embodiment 17 is the fuel injector of embodiment 16, wherein: the bottom surface of the fuel filter defines a protrusion that extends into the inlet passage in the direction of fuel flow through the fuel injector.

Embodiment 18 is the fuel injector of embodiment 17, wherein: a bottom of the cavity in the fuel filter provides a furthest portion of the top surface of the fuel filter from the fuel entrance to the inlet passage in the direction of fuel flow through the fuel injector; a bottom of the protrusion of the fuel filter provides a furthest portion of the bottom surface of the fuel filter from the fuel entrance to the inlet passage in the direction of fuel flow through the fuel injector; the upper housing portion defines a ledge within the inlet passage; the fuel filter seats on the ledge; and the ledge is positioned between the bottom of the cavity in the fuel filter and the bottom of the protrusion of the fuel filter, along the direction of fuel flow through the fuel injector.

Discussion of Calibration Insert

The calibration inserts 134 and 234 provide a fuel injector user an ability to modify a size of a space in which a spring in the fuel injector is retained, which provides the user with an ability to modify a compression of the spring and therefore an amount of force provided by the spring. The amount of spring force affects a speed at which the corresponding injector opens and closes. Accordingly, the adjustable calibration inserts 134 and 234 enable users to calibrate fuel flow dynamics of the fuel injectors.

The calibration insert 134 for the first fuel injector is only shown in FIG. 3 (sectional side view). The calibration insert 234 for the second fuel injector is shown in FIG. 13 (sectional side view of entire injector), 20A (perspective view of only insert), and 20B (perspective side view of only insert). A main difference between the two calibration inserts 134 and 234 is their dimensions, and the inserts otherwise share most (if not all) of the same features. As such, the following discussion focuses on the calibration insert 234 for the second fuel injector, but the discussion also applies to the calibration insert 134 for the first fuel injector.

Before providing detailed discussion of the calibration insert 234, some additional background on injector operation is provided. The second fuel injector dispenses fuel in response to receipt of an electric pulse. For example, an electronic control unit (ECU) may perform operations to open multiple injectors installed in an engine at specific times. When time has come to open the second fuel injector, the ECU sends a direct current pulse of electrical energy to the second fuel injector. The electrical energy is sent by an electrical conductor that ends with an electrical connector that is configured to removably mate with the electrical connector 212 of the second fuel injector.

A conducting element of the electrical connector 212 (e.g., a spade terminal) receives the electrical energy, and the electrical energy passes through the coil 242 and back to the ECU. The passage of the electrical energy through the coil 242 forms an electric field that produces a magnetic force that attracts the movable pintle 264, causing the movable pintle to overcome the downward bias towards the closed position that is imparted by the spring 235. As a result, the movable pintle 264 moves upward until an impact face of the movable pintle 264 contacts an impact face of the upper housing inlet tube 220. In other words, applying sufficient electrical energy to the coil 242 causes the movable pintle 264 to move from its closed position to its open position, enabling fuel to flow through the injector. When the pulse of electrical energy ends, the magnetic field subsides and the spring force provided by the spring 235 overcomes the magnetic force and the spring 235 moves the movable pintle 264 from the open position to the closed position.

Figure 20A:
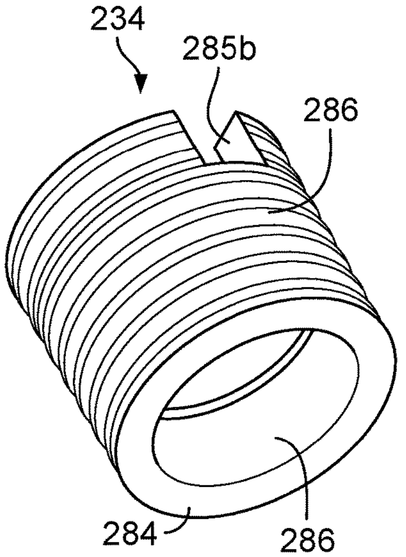
FIGS. 20A-B show various views of a calibration insert of the second fuel filter.
Figure 20B:
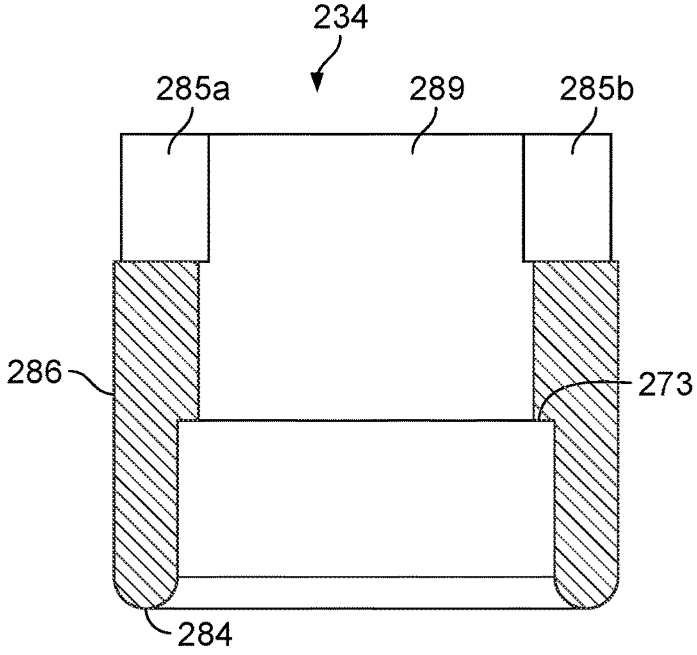
Figure 20C:
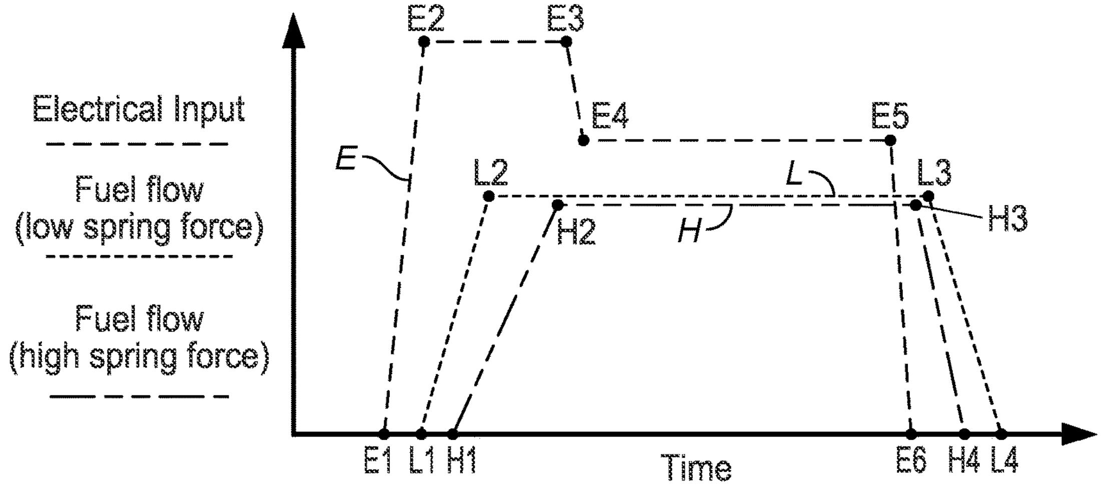
FIG. 20C shows a graph that illustrates an electrical pulse and resulting fuel flow rates at two different spring forces.

FIG. 20C shows a graph that illustrates specifics of the pulse of electrical energy provided by the ECU to the injector. The graph charts three data sets over time with three corresponding lines: (1) an electrical energy line "E", (2) a fuel flow with a low spring force line "L", and (3) a fuel flow with a high spring force line "H". Differences in fuel flow that result from different spring forces will be discussed in additional detail below, after a discussion that focuses on characteristics of the electrical energy that is provided to the fuel injector.

In this illustration, the ECU provides a constant voltage to the injector, for example a vehicle battery voltage of 12 or 16 volts. When the ECU determines that it is time to open the injector, the ECU performs operations to increase an amount electrical energy provided to the injector (e.g., by increasing amperage, and therefore the power provided to the injector). This increase in electrical energy is illustrated by line E, which shows no electrical energy being provided to the injector until point E1, at which point electrical energy rises to point E2.

FIG. 20C illustrates operations of a "peak and hold" ECU, which begins a supplied electrical energy pulse with a momentary "peak" amount of energy that is adapted to help an injector open quickly, before the pulse settles to a "hold" amount of energy that adapted to maintain the injector in its open state. This initial "peak" is represented in the graph by the electrical energy provided between points E2 and E3. The subsequent "hold" is represented in the graph by the electrical energy provided between points E4 and E5. An end of the electrical pulse is represented by a transition between points E5 and E6. An example amount of electrical energy provided by a "peak and hold" ECU is 8 amps of peak DC energy and 2 amps of hold DC energy (a height of the "peak" energy flow in FIG. 20C is under represented for illustrative purposes).

Transitions from one energy level to the next (e.g., from E1 to E2, from E3 to E4, and from E5 to E6) are shown in the graph with a slope because the transitions are not instantaneous. The transitions take some time because it takes time for electrical energy to saturate the coil 242 and establish a magnetic field, and because it takes time to reduce an amount of energy flowing through the coil 242 and the electrical field that is produced by that flowing energy.

The time that it takes an injector to open after a pulse of energy is received by the injector (the "opening time") and the time that it takes the injector to close after the pulse of energy subsides (the "closing time") is determined based upon multiple factors, including: (1) a magnitude of energy flow provided by the ECU, (2) a size of the lift gap 258 between the upper housing inlet tube 220 and the movable pintle 264, (3) an amount of friction between the movable pintle 264 and the upper guide 268, and an amount of friction between the movable pintle 264 and the lower guide and valve seat component 230, (4) an amount of fuel pressure in fuel provided to the injector, and (5) the spring force.

The spring force is an amount of force provided by the spring to the movable pintle 264, which biases the movable pintle 264 to the closed position and which pushes the movable pintle 264 back to the closed position once an electrical pulse ends. The spring force is affected by a type of spring 235 located within the injector (e.g., spring material, number of coils, overall length of spring, wire thickness), and a size of a space in which the spring 235 is compressed. If a type of the spring 235 and items #1 (amount of energy), #2 (size of lift gap), #3 (amount of friction), and #4 (amount of fuel pressure) are maintained as constant, adjusting the size of the space in which the spring 235 is compressed enables a user to calibrate the opening time and closing time for an injector. The size of the space in which the spring 235 is compressed is a space between the spring seating surface 273 of the calibration insert 234 and the spring seating surface 274 of the armature 238.

Calibrating a fuel flow rate of an injector can include assembling the injector entirely or almost entirely, except with fuel filter 211 left off. A user may then place the assembled injector into a testing machine to “flow” fuel or another liquid through the injector at one or more pressures, and measure operating characteristics of the fuel injector at the one or more pressures. For example, the user may measure an amount of fuel that flows through the injector over a given period of time and/or characteristics of each pulse of fuel (e.g., fuel dosage over a period of time or a single pulse). The user can interpret the operating characteristics of the injector, and may determine that more or less spring force is needed to achieve desired operating characteristics.

To increase spring force, the user can insert an instrument through the fuel entrance 201 while the filter 211 remains removed (or is removed if the measurements were performed with the filter 211 installed) to manipulate a position of the calibration insert 234 within the passage through the upper housing inlet tube 220.

A periphery of the calibration insert 234 includes outward-facing threads 286 that are adapted to engage inward-facing threads 287 of the upper housing inlet tube 220. As such, turning the calibration insert 234 adjusts a position of the calibration insert 234, within the passage through the upper housing inlet tube 220, along the pintle-movement axis 205. Accordingly, a user can turn the instrument inserted through the fuel entrance 201 to change a position of the calibration insert 234. The calibration insert 234 may include one or more slots 285*a-b* that are adapted to receive a screwdriver or similar tool, to facilitate user turning of the calibration insert 234.

After changing a position of the calibration insert 234 and therefore the spring force, the user can re-flow the injector to determine how the operating characteristics of the injector have changed. The user may repeatedly change a position of the calibration insert 234 and re-flow the injector until the injector exhibits desired operating characteristics.

The graph of FIG. 20C includes two example lines L and H representing how operating characteristics of a fuel injector may be affected by different positions of the calibration insert 234. Line L represents injector operation with a low spring force and line 430 represents an injector with a high spring force (with the low and high spring forces being relative to each other).

Discussing initially line L and operation of the injector with low spring force, point L1 represents a time at which fuel begins to flow out of the injector. An amount of fuel that flows through the injector continues to increase until point L2, which represents a moment at which the injector becomes fully open and fuel flows out of the injector at its maximum fuel flow rate. A maximum fuel flow rate (e.g., a magnitude of line L between points L2 and L3) is directly affected by a distance that the movable pintle 264 moves away from the annular sealing surface 278, which is defined by a size of the lift gap 258.

The opening time of the injector represented by line L is an amount of time between point E1 (electric energy begins to flow) and point L2 (injector is fully open). The opening time includes two sub-portions: (1) an opening delay, which represents time between point E1 (electric energy begins to flow) and point L1 (injector cracks open); and (2) a rise time, which represents time between point L1 (injector cracks open) and L2 (injector fully open).

The closing time of the injector represented by line L is an amount of time between E5 (electric energy begins to decrease) and point L4 (injector fully closed). The closing time includes two sub-portions: (1) a closing delay, which represents time between point E5 (electric energy begins to decrease) and point L3 (injector begins to close); and (2) a fall time, which represents a time between points L3 (injector begins to close) and L4 (injector fully closed). Fuel flow decreases between point L3 (injector begins to close) and point L4 (injector fully closed).

The fall time is shorter than the rise time. Stated another way, the movable pintle 264 moves a same distance more quickly when closing. This quicker movement when closing is because it be easier for the spring 235 to overcome a decreasing magnetic field and move the movable pintle 264 to the closed position than it is for an increasing magnetic field to overcome the force applied by the spring and move the movable pintle 264 to the open position. An example rise time and corresponding fall time is 1.4 ms and 0.8 ms.

Line H represents an injector has a higher spring force than the injector of line L (e.g., as a result of there being a smaller distance between the spring seating surfaces 273 and 274), but in which other factors remain constant. The opening time for the injector represented with line H is longer than that of the injector represented by line L, both: (1) because the opening delay from E1 (electric energy begins to increase) to H1 (injector begins to open) is longer than the opening delay from E1 (electric energy begins to increase) to L1 (injector beings to open); and (2) because the rise time from H1 (injector begins to open) to H2 (injector becomes fully open) is longer than the rise time from L1 (injector begins to open) to L2 (injector becomes fully open). This is because an injector exhibiting stronger spring force can require more magnetic force to begin opening, and more magnetic force to transition from closed to open.

Conversely, the closing time for the injector of line H (higher spring force) is shorter than that of the injector if line L (lower spring force), both: (1) because the closing delay from E5 (electric energy begins to decrease) to H3 (injector begins to close) is shorter than the closing delay from E5 (electric energy begins to decrease) to L3 (injector begins to close); and (2) because the fall time from H3 (injector begins to close) to H4 (injector fully closes) is shorter than the fall time from L3 (injector begins to close) to L4 (injector fully closes). This is because an injector exhibiting stronger spring force can more easily and quickly overcome the magnetic force once the magnetic force begins to dissipate, and can more quickly complete the transition from open to close.

An amount of area under line L represents an amount of fuel that a fuel injector with the low spring force setting dispenses with a single electrical pulse. An amount of area under line H represents an amount of fuel that the fuel injector with the relatively high spring force setting dispenses with the single electrical pulse. As shown in FIG. 20C, the low spring force setting dispenses more fuel with a single electrical pulse, because the lower spring force causes the injector to open more quickly and stay open longer.

Notably, the calibration insert 234 is accessible via the fuel entrance 201, and the fuel injector can remain assembled (e.g., except for a presence of fuel filter 211 in the inlet passage 247) during spring force calibration. For example the lower housing portion 216 need not be detached from the upper housing portion 202 to change the position of the calibration insert 234. Also, the calibration insert 234 can be moved in both directions while the injector remains assembled, both to increase and decrease the distance between the spring seating surfaces 273 and 274.

A user can set a calibrated position of the calibration insert 234 using a threadlocking substance and/or an adhesive. For example, a threadlocking substance may be applied to a bottom portion of the threads 286 of the calibration insert 234 (e.g., the bottom three threads). Additionally or alternatively, an adhesive may be applied to a top portion of the calibration insert (e.g., with a syringe to direct the adhesive into a top portion of the threads 287 and/or into the openings 285*a-b*). The adhesive and the threadlocking substance may work together to retain a position of the calibration insert 234. The adhesive may be a UV cured adhesive.

The calibration insert 234 may be made of a metal, for example, a magnetic stainless steel alloy. The calibration insert 234 may have been machined from a billet of the magnetic stainless steel alloy, and therefore may have a unitary stainless steel body. An outside peripheral surface of the calibration insert 234 may have a cylindrical shape, and may define outward-facing threads 286 adapted to engage inward-facing threads 287 that are defined by an inner-facing surface of the upper housing inlet tube 220.

The outward-facing threads 286 of the calibration insert 234 may extend an entire length of the calibration insert 234. The inward-facing threads 287 of the upper housing inlet tube 220 may not extend an entire length of the upper housing inlet tube 220. For example, the upper housing inlet tube 220 may have three sections to the inlet passage 247: (1) a first section that is unthreaded and that extends from the fuel entrance 201 to a top of the threading; (2) a second section that is threaded, and (3) a third section that is unthreaded and that extends from a bottom of the threading to an exit from the inlet passage 247.

A diameter of the first section may be larger than a diameter of the second section, to enable user insertion of the calibration insert 234 through the first section of the inlet passage 247 until the threads engage each other. The threading of the second section may be longer than a length of the calibration insert 234 and the threads thereon, enabling the calibration insert 234 to be twisted through a range of positions along the pintle-movement axis 205. A ledge 288 may be adapted to receive a lower end of the calibration insert to prevent movement of the calibration insert 234 past a permissible range of positions.

The ledge 288 may separate the second (threaded) section of the inlet passage 247 from the third (unthreaded) section of the inlet passage 247. The ledge 288 may be a ledge produced by a reduction in diameter of the passage 247, and may produce a step reduction in diameter (e.g., with the step being provided by a sloped surface). As such, the third section of the inlet passage 247 may have a diameter that is less than a diameter of the second section of the inlet passage 247. The diameter of the third second of the inlet passage 247 may correspond to, be larger than, or be smaller than a diameter of the passage 289 through the calibration insert 234.

The passage 289 through the calibration insert 234 may be a bore. The calibration insert 234 may define a ledge within the passage 289, with the ledge adapted to provide a spring seating surface 273 that seats a top end of the spring 235. An inner diameter of a passage through the spring 235 may correspond to, be larger than, or be smaller than a diameter of a top portion of the passage 289 through the calibration insert 234. In some implementations, the spring 235 seats on a bottom end 284 of the calibration insert rather than within the passage 289 (e.g., with the passage 289 having a consistent diameter and being without a spring-seating ledge).

A top end of the calibration insert defines two slots 285*a-b* adapted to receive a blade of a turning tool, such as a screwdriver. The passage 289 separates the two slots 285*a-b* from each other.

As additional description to the embodiments described above, the present disclosure describes the following embodiments.

Embodiment 1 is a fuel injector, comprising: an upper housing portion that defines an inlet passage adapted to receive fuel; a lower housing portion that defines an injector outlet adapted to dispense fuel; an electromagnetic coil assembly; a movable pintle that is: (i) biased to a closed position that is adapted to prevent fuel from flowing through the injector outlet, and (ii) movable, responsive to magnetic force produced by energizing the electromagnetic coil assembly, to an open position that is adapted to permit fuel to flow through the injector outlet; a spring that: (i) imparts a force to the movable pintle, with a first end of the spring contacting a first spring seating surface of the movable pintle; and (ii) biases the movable pintle to the closed position; and a calibration insert that: (i) is located within the inlet passage; (ii) has a second spring seating surface, which contacts a second end of the spring; and (iii) is user movable back and forth along a range of positions within the inlet passage, while the upper housing portion and the lower housing portion are assembled together, to change a distance between the first spring seating surface and the second spring seating surface and calibrate the force imparted by the spring to the movable pintle.

Embodiment 2 is the fuel injector of embodiment 1, wherein: the range of positions within the inlet passage extend along an axis defined by a direction in which the movable pintle is adapted to move between the closed position and the open position.

Embodiment 3 is the fuel injector of any one of embodiments 1-2, wherein: the calibration insert defines a calibration insert fuel passage that extends through the calibration insert.

Embodiment 4 is the fuel injector of embodiment 3, wherein: the calibration insert defines a ledge within the calibration insert fuel passage; and the ledge provides the second spring seating surface that contacts the second end of the spring.

Embodiment 5 is the fuel injector of embodiment 4, wherein: the calibration insert fuel passage comprises a bore; the ledge defines a transition between (a) an upper portion of the calibration insert fuel passage, which has a first diameter, and (b) a lower portion of the calibration insert fuel passage, which has a second diameter; and the second diameter of the lower portion of the calibration insert fuel passage is greater than the first diameter of the upper portion of the calibration insert fuel passage.

Embodiment 6 is the fuel injector of any one of embodiments 4-5, wherein: the spring is positioned within the inlet passage so that fuel that exits the calibration insert fuel passage passes through a center of the spring.

Embodiment 7 is the fuel injector of any one of embodiments 1-6, wherein: the inlet passage comprises a bore that extends through the upper housing portion along an axis defined by a direction in which the movable pintle is adapted to move between the closed position and the open position.

Embodiment 8 is the fuel injector of any one of embodiments 1-7, wherein: the calibration insert comprises a stainless steel body.

Embodiment 9 is the fuel injector of any one of embodiments 1-8, wherein: a periphery of the calibration insert defines first threads; part of the upper housing portion that defines the inlet passage defines second threads; and the calibration insert is located within the inlet passage with the first threads and the second threads engaged.

Embodiment 10 is the fuel injector of embodiment 9, wherein: the inlet passage includes: (i) a first section; (ii) a threaded section that defines the second threads and that occurs after the opening portion along a direction in which fuel is adapted to flow through the inlet passage; (iii) a third section that occurs after the threaded portion along the direction in which fuel is adapted to flow through the fuel injector; and a diameter of the threaded section of the inlet passage is greater than a diameter of the third section of the inlet passage.

Embodiment 11 is the fuel injector of embodiment 10, wherein: a diameter of the first section of the inlet passage is greater than the diameter of the threaded section of the inlet passage.

Embodiment 12 is the fuel injector of embodiment 11, wherein: the fuel injector includes a threadlocking substance located between the first threads and the second threads.

Embodiment 13 is the fuel injector of embodiment 12, wherein: the first threads and the second threads engage at a threaded portion of engagement that includes (i) an upper threaded portion of engagement between the calibration insert and the inlet passage that is proximal a fuel entrance to the inlet passage, and (ii) a lower threaded portion of engagement between the calibration insert and the inlet passage that is distal the fuel entrance to the inlet passage; the threadlocking substance is present at the lower threaded portion of engagement and absent at the upper threaded portion of engagement; and an adhesive different from the threadlocking substance is present at the upper threaded portion of engagement and absent at the lower threaded portion of engagement.

Embodiment 14 is the fuel injector of any one of embodiments 1-13, wherein: the calibration insert includes an upper surface that is proximal a fuel entrance to the inlet passage; the calibration insert includes a lower surface that is distal the fuel entrance to the inlet passage; the upper surface includes a feature that is adapted to receive a user tool introduced into the inlet passage to move the calibration insert back and forth along the range of positions.

Embodiment 15 is the fuel injector of embodiment 14, wherein: the feature that is adapted to receive the user tool comprises a slot for a screwdriver.

Embodiment 16 is the fuel injector of embodiment 15, wherein: the slot includes a first slot portion separated from a second slot portion by a calibration insert fuel passage that extends through the calibration insert.

Discussion of Removable Coil

The first and second fuel injectors are structured to enable user removal of their respective coil assembly while the injectors remain in a mostly-assembled state. For example, the coil assemblies may be removed while the upper and lower housing portions remain assembled. As such, a coil assembly may be easily replaced by a user without having to expose internal fuel-receiving spaces of a fuel injector.

Easy coil replacement is beneficial because coil assemblies can fail and need replacement. Coil assemblies are relatively fragile (at least with respect to solid metal components of an injector). A coil assembly may fail after being exposed to fire, excessive heat, fuel, or solvents. Such exposure can degrade insulation of wire that forms the coil portion of the coil assembly, electrically shorting the coil and reducing or eliminating its ability to produce a magnetic field. An ability to replace a coil assembly using common tools, for example by a user at a racetrack, allows repair of an injector that has suffered coil assembly failure. Moreover, locating the coil assembly outside a periphery of an upper housing portion of a fuel injector can separate the coil assembly from fuel that flows through the injector, which can limit a likelihood that fuel will interact with and damage the coil assembly.

While many figures show the removable coil assemblies, the sectional side views provided by FIG. 3 (first fuel injector) and FIG. 13 (second fuel injector) are particularly-helpful illustrations of the removable functionality. With both injector designs, the coil assembly 114, 214 defines a coil assembly bore that extends entirely through the coil assembly 114, 214. The coil assembly bore has a diameter that is greater than a width of the upper housing portions 102, 202. For example, the upper housing portion 102, 202 defines a ledge 137, 237 onto which the coil assembly 114, 214 is adapted to seat, after insertion of the coil assembly 114, 214 over an upper section of the upper housing portion 102, 202. The ledge 137, 237 may entirely surround the inlet passage 147, 247, and the coil assembly 114, 214 may seat on the ledge 137, 237 entirely around the inlet passage 147, 247.

The coil assembly 114, 214 may not contain a physical electrical connection to another component of the fuel injector (e.g., there is no physical electrical connection between the coil assembly 114, 214 and the upper housing body 103, 203). Rather, actuation of the fuel injectors may be performed by magnetic fields that pass through the upper housing body 103, 203 to act on the movable pintle 164, 264. The coil assembly 114, 214 receives electricity via electrical connector 112, 212 (e.g., an electricity-receiving connection terminal), which is adapted to connect to a corresponding electrical connector located at an end of an electrical cable that extends from an electronic control unit (ECU).

The ledge 137, 237 may separate a lower section of the upper housing portion 102, 202 from an upper section of the upper housing portion 102, 202, with the lower section having a greater diameter than the upper section. A diameter of the bore defined by coil assembly 114, 214 is greater than a diameter of the upper section of the upper housing portion 102, 202, enabling the coil assembly 114, 214 to be slid down over top of the upper housing portion 102, 202.

To retain the coil assembly 114, 214 in place after being assembled onto the upper housing portion 102, 202, a coil retention device can be used. With the first fuel injector, the coil retention device is snap ring 136. With the second fuel injector, the coil retention device is snap ring 236. Both snap rings 136, 236 seat in annular, outward-facing channels defined by an outer peripheral wall of the upper housing body 103, 203. The snap ring 136, 236 extends outward away from the upper housing body 103, 203 further than the diameter of the bore through the coil assembly 114, 214, which prevents the coil assembly 114, 214 from sliding up and away from the ledge 137, 237. As such, the snap ring 136, 236 contacts both the upper housing body 103, 203 and a top portion of the coil assembly 114, 214.

The snap ring 136, 236 may be removed by user manipulation of the snap ring 136, 236. For example, a user may spread ends of the snap ring 136, 236 to increase the diameter of the snap ring 136, 236 (e.g., by placing tips of snap ring pliers into snap ring holes, such as those shown by the external view of FIG. 11). With the first fuel injector, a user first removes the snap ring 104 (which retains the seal retainer 110 in place), and then removes the seal retainer 110. Removal of these components provides user access to the snap ring 136.

The first and second fuel injectors each include an upper housing portion 102, 202 that is attached to a lower housing portion 116, 216, for example, by threading the lower housing portion 116, 216 into a cavity defined by a lower section of the upper housing portion 102, 202, so that the threads 166, 266 of the lower housing portion 116, 216 engage with the threads 161, 261 of the upper housing portion. Being able to remove the coil assembly 114, 214 from a remainder of the fuel injector without disassembling the upper housing portion 102, 202 from the lower housing portion 116, 216 provides various benefits. For example, internal spaces within the fuel injector that receive fuel are not exposed to environmental contaminants during replacement of a coil assembly 114, 214. Also, a threadlocking substance may have been applied to the threads during assembly, and heat may need to be applied to a location of the threads to permit disassembly, which may can increase an effort involved in replacing a coil assembly located inside of the upper housing portion 102, 202.

With the first and second fuel injectors, the upper housing portion 102, 202 includes an upper housing body 103, 203 and an upper housing inlet tube 120, 220. The upper housing inlet tube 120, 220 is located at least partially within an upper portion of the upper housing body 103, 203, and the components are assembled together other via threaded surfaces. Specifically, the upper housing inlet tube 120, 220 includes outward-facing threads 165, 265 (of a threaded peripheral wall) that engage inward-facing threads 156, 256 (of a threaded annular wall) of the upper housing body 103, 203.

To assemble the upper housing inlet tube 120, 220 and the upper housing body 103, 203, the upper housing inlet tube 120, 220 is inserted into a bottom opening in a passage through the upper housing body 103, 203, until the threads of the components engage and the components are threaded together. A distance that the upper housing inlet tube 120, 220 is threaded into the upper housing body 103, 203 defines a location of the upper housing inlet tube 120, 220 and therefore a location of a bottom, impact face of the upper housing inlet tube 120, 220. The location of the impact face of the upper housing inlet tube 120, 220 directly affects a "lift gap" distance that the movable pintle 164, 264 is able to move, and therefore directly affects a maximum fuel flow rate of the injector (e.g., in pounds per hour).

The upper housing body 103, 203, the upper housing inlet tube 120, 220, and the coil assembly 114, 214 all include a passage (e.g., a bore) that extends entirely through a center of the respective component. The passages may all be aligned and share a common axis (e.g., the pintle-movement axis 105, 205). The upper housing body 103, 203 may extend entirely through the passage through the coil assembly 114, 214, such the passage through the coil assembly 114, 214 is shorter than an upper portion of the upper housing body 103, 203. The upper housing inlet tube 120, 220 may extend partially through the passage that extends through the upper housing body 103, 203 (with only a bottom end of the upper housing inlet tube 120, 220 being located within the passage that extends through the upper housing body 103, 203). The passage through the upper housing inlet tube 120, 220 is adapted for pressurized fuel flow, and includes the calibration insert 134, 234 entirely therein and the spring at least partially therein.

The upper housing inlet tube 120, 220 defines a first circular channel into which O-ring 108, 208 is seated, with the O-ring 108, 208 adapted to seal the upper housing inlet tube 120, 220 to a fuel dispensing attachment (e.g., a bung of a fuel rail). The upper housing inlet tube 220 defines second circular channels into which O-rings 207*a-b* are seated, with the O-rings 207*a-b* being adapted to seal the interface between the upper housing inlet tube 120, 220 and the upper housing body 103, 203, so that fuel does not leak out of the injector at the interface.

Figure 21A:
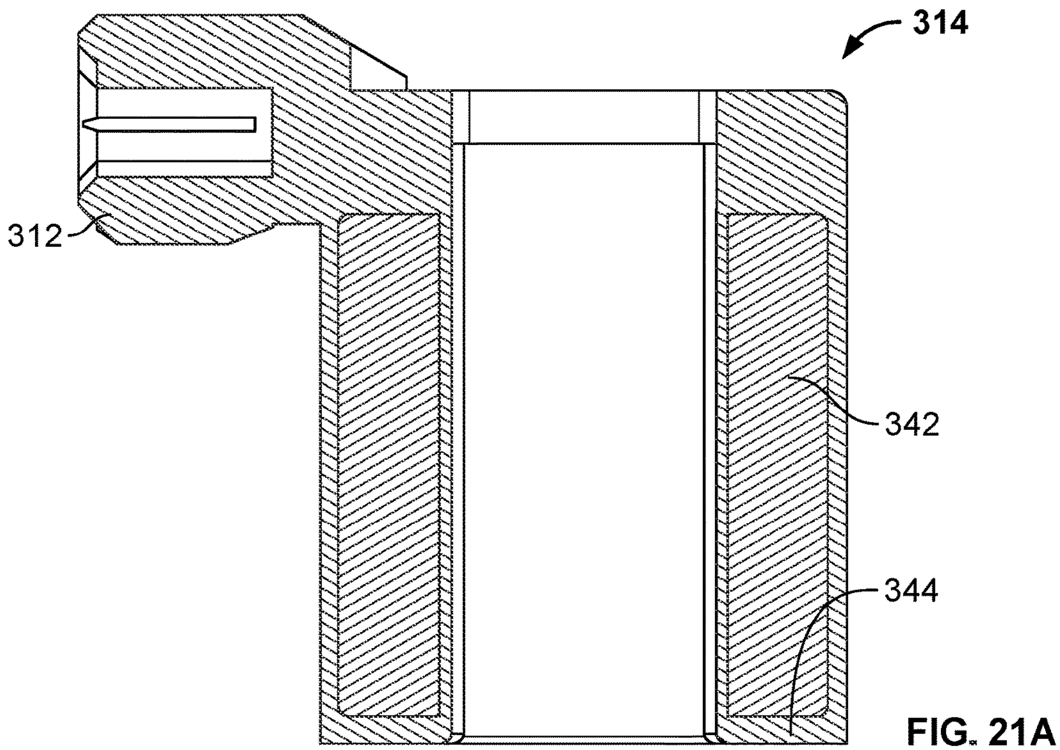
FIGS. 21A-C show sectional side views of components of a third fuel injector, including its coil assembly, upper housing body, and upper housing inlet tube.
Figure 21B:
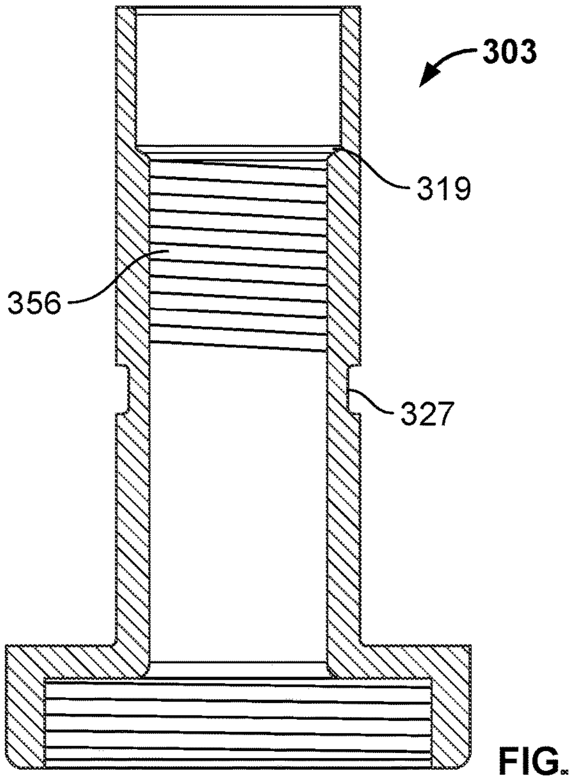
Figure 21C:
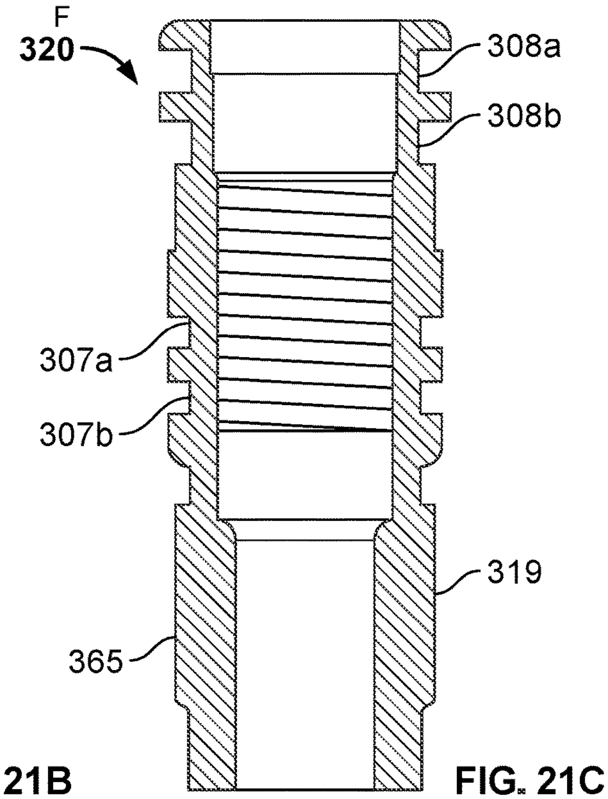

FIGS. 21A-C show sectional side views of components of a third fuel injector, including its coil assembly 314, upper housing body 303, and upper housing inlet tube 320. The coil assembly 314 is similar to or same as the coil assemblies 114, 214 of the first and second fuel injectors. The coil assembly 314 includes a coil 342, a bobbin 344 around which the coil is wrapped, and an electrical connector 312 to receive electricity for powering the coil 342.

The upper housing body 303 is similar to the upper housing bodies 103, 203 of the first and second fuel injectors. All upper housing bodies 103, 203, 303 define a ledge 119, 219, 319 within the passage that extends through the respective upper housing body. A difference between the injectors is that the ledge 319 in the third injector is upward facing, rather than downward facing as with the ledges 119, 219 in the first and second injectors. As such, in the third injector, a diameter of the passage above the ledge 319 is larger than a diameter of the passage below the ledge 319. With the first and second injectors, the diameter of the passage below the ledge 119, 219 is larger than the diameter of the passage above the ledge 119, 219.

The shape of the upper housing body 303 of the third injector enables the upper housing inlet tube 320 to be inserted into a top opening to the passage through the upper housing body 303. The upper housing inlet tube 320 includes outward-facing threads 365 that are adapted to engage the inward-facing threads 356 of the upper housing body 303, such that the components can be threaded together to form an assembly that provides an upper housing portion.

An ability to insert the upper housing inlet tube 320 into the top opening of the upper housing body 303 means that the upper housing body 303 and the lower housing portion (not shown in FIGS. 21A-C) can remain assembled while the upper housing inlet tube 320 is: (i) introduced into the passage through the upper housing body 303, and/or (ii) movably adjusted up and down within the passage through the upper housing body 303. With the first and second injectors, the upper housing inlet tubes 120, 220 are inserted into a bottom entrance to the passage through the upper housing bodies 103, 203, such that the upper housing bodies 103, 203 are first disassembled from the lower housing portions 116, 216 to provide access to the bottom entrance.

Another benefit provided by the design of the third injector is that the O-rings that surround the upper housing inlet tube 320 and that seal the upper housing inlet tube 320 to the upper housing body 303 can be replaced by unthreading the upper housing inlet tube 320 up and out of the upper housing body 303, without having to disassemble the upper housing body 303 from the lower housing portion.

The upper housing inlet tube 320 has a shape that is different than that of the first and second upper housing inlet tubes 120, 220. With the first and second upper housing inlet tubes 120, 220, a diameter of a bottom portion is greater than a diameter of a top portion, such that the upper housing inlet tubes 120, 220 define a ledge that may contact the ledge 119, 219 of the upper housing body 103, 203. The upper housing inlet tube 320 is shown with a consistent outer-most diameter. The upper housing inlet tube 320 has a section with outward-facing threads 365, another section that defines two channels 307*a-b* to receive O-rings to seal against the upper housing body 303, and defines two channels 308*a-b* to receive O-rings to seal with a fuel-delivery attachment (e.g., a bung of a fuel rail).

While this disclosure references fuel injectors in which the upper housing portion includes an upper housing body sub-component and an upper housing inlet tube sub-component, the injectors may be designed with the upper housing body sub-component and upper housing inlet tube sub-component provided by an integral structure (e.g., such that the sub-components are not separate items that are threaded together). For example, injectors designed to have removable coils (as referenced in this disclosure) may implement an upper housing portion that includes integral body and inlet tube portions.

Figure 22A:
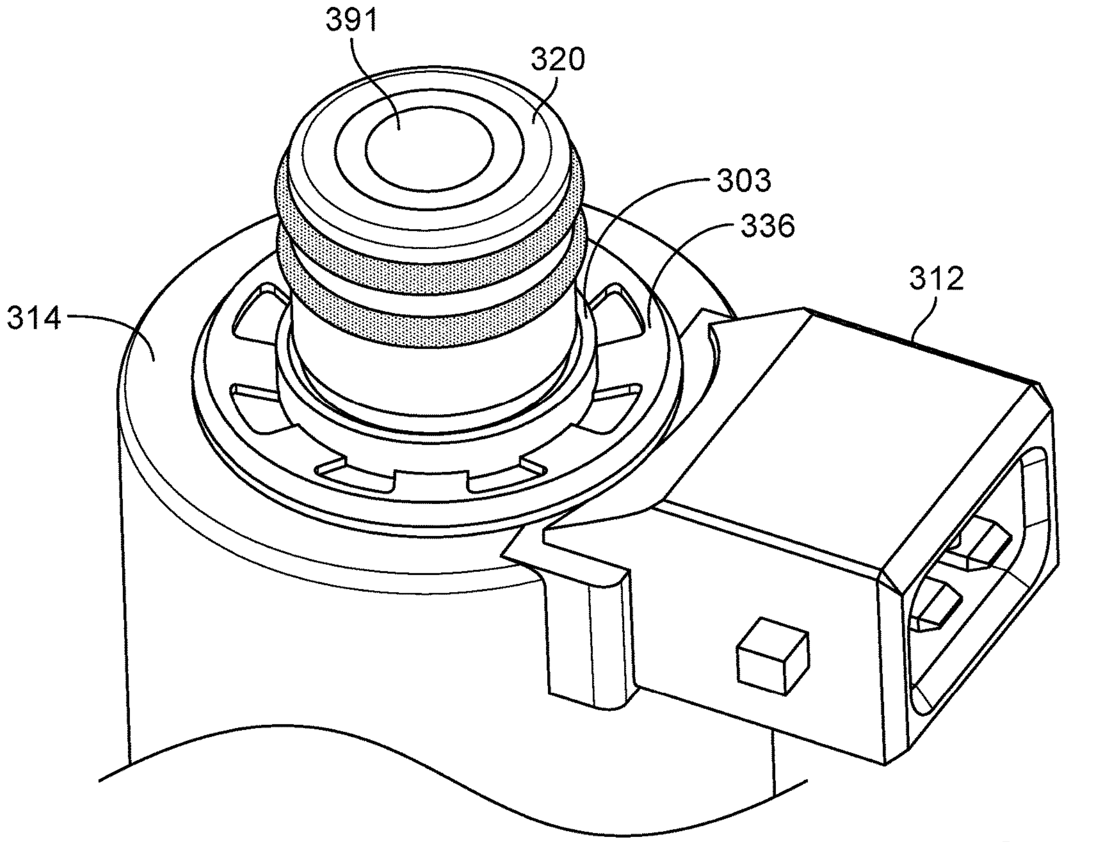
FIG. 22A-C show various views of an alternative retention device for a coil assembly.
Figure 22B:
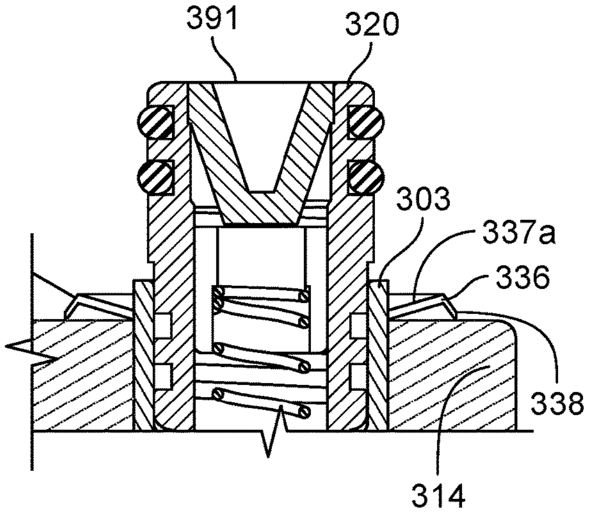
Figure 22C:
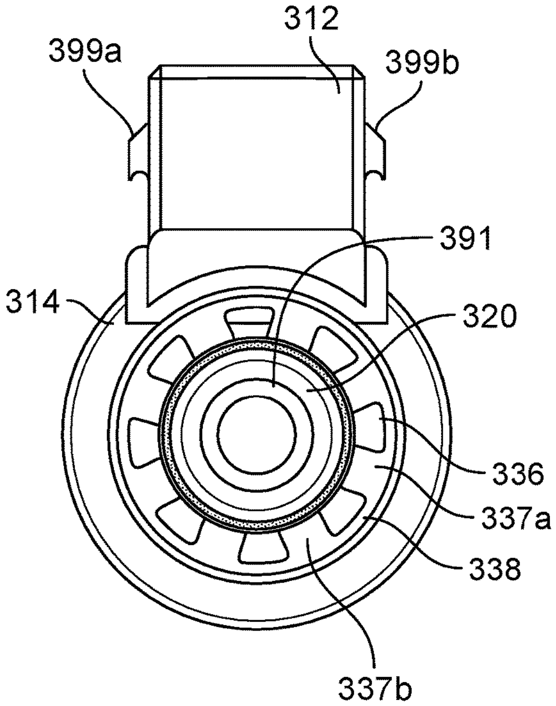

FIGS. 22A-C show various views of the third fuel injector, including how the third fuel injector includes a self-locking retaining ring 336 that retains the coil assembly 314 to the upper housing body 303. This is a difference in retention mechanism in comparison to the first and second fuel injectors, which are shown with snap rings 136, 236 that seat within grooves of the upper housing body 103, 203. The upper housing body 303 of the third fuel injector may not include any such groove to retain a snap ring. Rather, the self-locking retaining ring 336 may retain the coil assembly 314 in position.

The self-locking retaining ring 336 may include an annular portion 338, from which multiple inwardly-facing fingers extend (e.g., fingers 337*a-b*). As shown in the sectional side view of FIG. 22B, the fingers 337*a-b* may extend downward from the annular portion 338, although the self-locking retaining ring 336 may be used in its opposite orientation in which the fingers would extend upward from the annular portion 338. In the orientation shown in FIG. 22B, the annular portion 338 contacts the coil assembly 314, while the fingers 337*a-b* contact at least the upper housing body 303 (and possibly concurrently contact the coil assembly 314).

The electrical connector 312 that is shown in FIG. 33C includes locking lugs 399*a-b* that are each adapted to receive a locking wire from an electrical connector that provides electricity to the injector and that mates with the electrical connector 312. The locking lugs 399*a-b* each include (i) a slanted leading face that is adapted to contact the locking wire when the electrical connectors are being engaged, and (ii) a trailing curved holding face that is adapted to retain the locking wire once the electrical connectors have engaged.

As additional description to the embodiments described above, the present disclosure describes the following embodiments.

Embodiment 1 is a fuel injector, comprising: an upper housing portion that defines an inlet passage adapted to receive fuel; a lower housing portion that is attached to the upper housing portion and that defines an injector outlet adapted to dispense fuel; an electromagnetic coil assembly that is user removable while the upper housing portion remains attached to the lower housing portion; a movable pintle that is: (i) biased to a closed position that is adapted to prevent fuel from flowing through the injector outlet, and (ii) movable, responsive to magnetic force produced by energizing the electromagnetic coil assembly, to an open position that is adapted to permit fuel to flow through the injector outlet.

Embodiment 2 is the fuel injector of embodiment 1, wherein: the electromagnetic coil assembly surrounds an outer periphery of the upper housing portion.

Embodiment 3 is the fuel injector of any one of embodiments 1-2, wherein: the electromagnetic coil assembly defines a coil assembly bore; the upper housing portion has an upper section with an annular outer periphery; and the upper section of the upper housing portion is located within the coil assembly bore of the electromagnetic coil assembly.

Embodiment 4 is the fuel injector of any one of embodiments 1-3, wherein: the upper housing portion defines a ledge; and the electromagnetic coil assembly is seated on the ledge of the upper housing portion.

Embodiment 5 is the fuel injector of embodiment 4, wherein: the ledge is provides an annular surface that entirely surrounds the inlet passage; and the electromagnetic coil assembly is seated on the annular surface of the ledge entirely around the inlet passage.

Embodiment 6 is the fuel injector of embodiment 5, comprising: a retention device that is in contact with the upper housing portion and the electromagnetic coil assembly, and that retains the electromagnetic coil assembly in contact with the upper housing portion; and the retention device is user-manipulatable to enable user removal of the electromagnetic coil assembly from the upper housing assembly.

Embodiment 7 is the fuel injector of embodiment 6, wherein: the upper housing portion defines a groove; and the retention device comprises a user-removable clip that is located in groove of the upper housing portion.

Embodiment 8 is the fuel injector of embodiment 6, wherein: the retention device comprises a self-locking retaining ring that includes multiple fingers in contact with the upper housing portion.

Embodiment 9 is the fuel injector of any one of embodiments 1-8, wherein: the fuel injector is adapted, while the upper housing portion remains attached to the lower housing portion, to: enable user-removal of the electromagnetic coil assembly; receive a replacement electromagnetic coil assembly that is different from the electromagnetic coil assembly; and receive and dispense fuel after having received the replacement electromagnetic coil, such that the electromagnetic coil assembly can be replaced without detaching the upper housing portion from the lower housing portion.

Embodiment 10 is the fuel injector of any one of embodiments 1-9, wherein: the electromagnetic coil assembly includes an electricity-receiving connection terminal adapted to removably mate with an electricity-providing connection terminal to receive electricity and energize the electromagnetic coil assembly; and the electromagnetic coil assembly is without a physical electrical connection to the upper housing portion and without a physical electrical connection to the lower housing portion.

Embodiment 11 is the fuel injector of any one of embodiments 1-10, wherein: an upper section of the lower housing portion has a threaded peripheral wall; a lower section of the upper housing portion defines a cavity with a threaded annular wall; and the lower housing portion is attached to the upper housing portion by way of the upper section of the lower housing portion being threaded into the cavity defined by the lower section of the upper housing portion; and the lower housing portion is user-removable from the upper housing portion by unthreading the lower housing portion from the upper housing portion.

Embodiment 12 is the fuel injector of any one of embodiments 1-11, wherein: the upper housing portion includes an upper housing body and an upper housing inlet tube that is located at least partially within the upper housing body.

Embodiment 13 is the fuel injector of embodiment 12, wherein: the electromagnetic coil assembly defines a coil bore that extends through the electromagnetic coil assembly; the upper housing body defines a housing body bore that extends through the upper housing body; the upper housing inlet tube defines the inlet passage, and the inlet passage comprises an inlet bore; and the coil bore, the housing body bore, and the inlet bore are aligned and share a central axis.'

Embodiment 14 is the fuel injector of embodiment 13, wherein: the coil bore is shorter than the housing body bore; and the upper housing body extends completely through the coil bore.

Embodiment 15 is the fuel injector of embodiment 14, wherein: the upper housing inlet tube extends only partially into the housing body bore.

Embodiment 16 is the fuel injector of any one of embodiments 12-15, wherein: the upper housing inlet tube defines a first circumferential groove; and the fuel injector comprises a first O-ring seated in the first circumferential groove and adapted to seal the upper housing inlet tube to a fuel dispensing attachment.

Embodiment 17 is the fuel injector of embodiment 16, wherein: the upper housing inlet tube defines a second circumferential groove; and the fuel injector comprises a second O-ring that is seated in the second circumferential groove and that is in contact with the upper housing body.

Embodiment 18 is the fuel injector of any one of embodiments 12-17, wherein: the upper housing inlet tube has a threaded peripheral wall; the upper housing body defines a passage with a threaded annular wall; and the upper housing inlet tube is attached to the upper housing body by way of the upper housing inlet tube being threaded into the upper housing body.

Embodiment 19 is the fuel injector of embodiment 18, wherein: a lower end of the upper housing inlet tube defines an inlet tube impact face; an upper end of the movable pintle defines a pintle impact face; the pintle impact face is adapted to contact the inlet tube impact face when the movable pintle is in the open position; the fuel injector defines a lift gap between the pintle impact face and the inlet tube impact face when the movable pintle is in the closed position; and a size of the lift gap is user adjustable by changing an amount that the upper housing inlet tube is threaded into the upper housing body.

Embodiment 20 is the fuel injector of embodiment 19, wherein: the upper housing inlet tube and the upper housing body are structured such that the upper housing inlet tube is able to be removed from being in contact with the upper housing body while the lower housing portion remains attached to the upper housing body.

Discussion of Housing Cutout

Figure 23A:
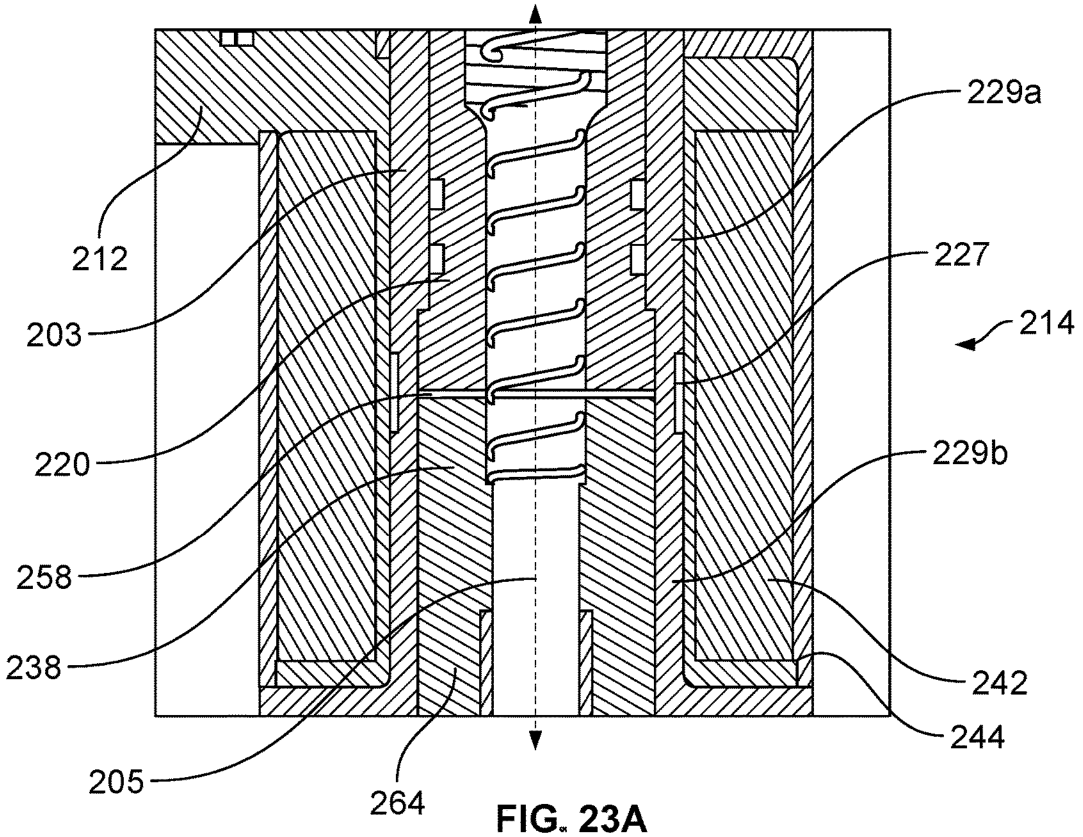
FIGS. 23A-B show various views of a portion of the second fuel injector surrounding the lift gap.

FIG. 23A shows a portion of the FIG. 13 sectional view of the second fuel injector. The sectional view is reproduced in FIG. 23A to highlight how the wall between the coil assembly 214 and the pintle-movement axis 205 includes a thinned region 227. The thinned region 227 of the wall is a feature that enhances an amount of magnetic flux transferred through the thinned region 227 with respect to: (i) an amount of magnetic flux transferred through adjacent portions 229*a-b*, and (ii) an amount of magnetic flux that would transfer through thinned region 227 if it had a thickness of the adjacent portions 229*a-b*.

The increased magnetic flux enhances a strength of magnetic forces provided by the coil assembly 214 to the armature 238 of the movable pintle 264. These forces pull the movable pintle 264 upwards until an impact face at a top of the movable pintle 264 contacts an impact face at a bottom of the upper housing inlet tube 220. The magnetic forces are enhanced because air may provide greater magnetic flux in comparison to a material of the wall (e.g., a stainless steel metal alloy).

The thinned region 227 may define a bottom of an outward-facing channel that provides for an air gap between the thinned region 227 and the bobbin 244 of the coil assembly 214. The thinned region 227 may be thinned with respect to the adjacent portions 229*a-b*, which may be offset from (e.g., separated by a step ledge) and adjacent to a location of the thinned region 227 along the pintle-movement axis 205. The thinned region 227 and the adjacent portions 229*a-b* may entirely surround the pintle-movement axis 205, and the thinned region 227 may be thinner than the adjacent portions 229*a-b* at all corresponding locations around the pintle-movement axis 205 (e.g., such that the outward-facing channel at the location of the thinned region 227 may be uninterrupted about the pintle-movement axis 205).

Figure 23B:
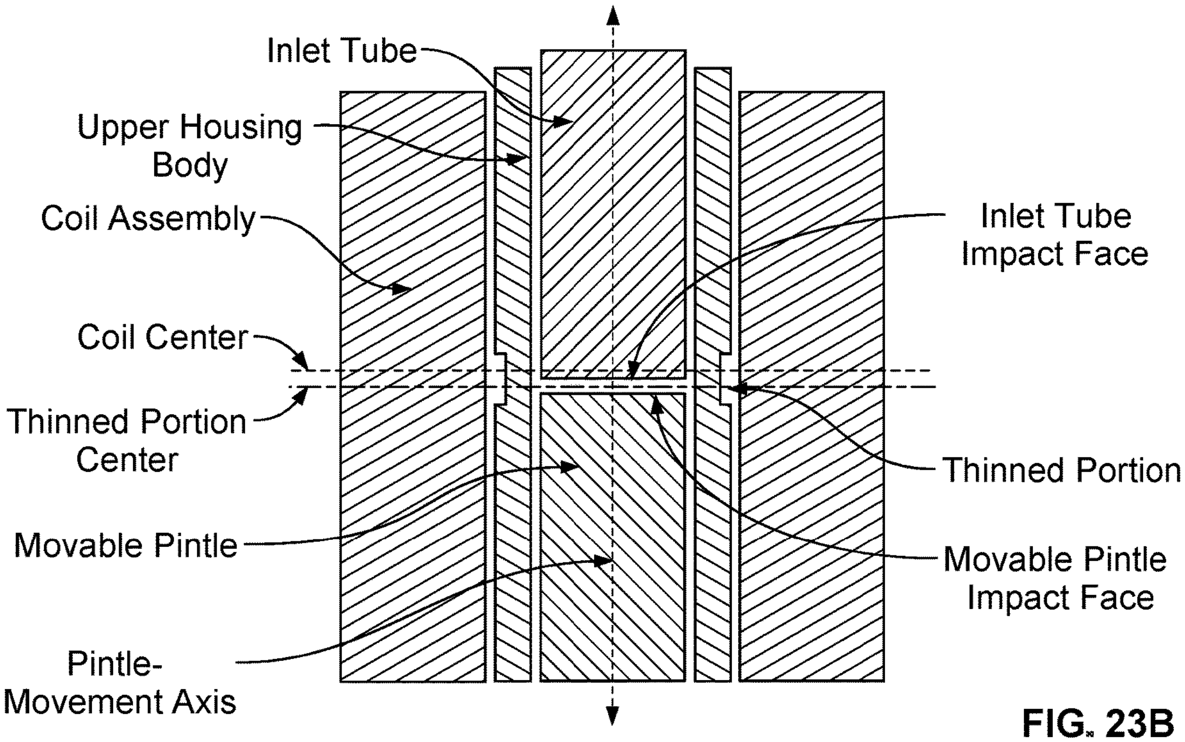

FIG. 23B shows a simplified sectional representation of a portion of the second fuel injector that includes the thinned wall portion. As illustrated by FIG. 23B, the thinned region spans a length along the pintle-movement axis that includes a location of the inlet tube impact face.

The center of the coil assembly may be located at or above the inlet tube impact face, so that upward force is imparted upon the moveable pintle during an entirety of its movement from the closed position to the open position. The thinned region of the wall spans, along the pintle-movement axis, the center of the coil assembly, to provide increased magnetic coupling between the coil assembly and the movable pintle.

The thinned region of the wall may span the lift gap between the upper housing inlet tube and the movable pintle, such that both impact faces are located within the thinned region of the wall along the pintle-movement axis. A center of the thinned region may be located below a center of the coil.

The third fuel injector includes a comparable thinned region, as shown in FIG. 21B. While the first fuel injector is not shown with a comparable thinned region (see FIG. 3), the first fuel injector could be implemented with a comparable thinned region in the upper housing body 103 of the first fuel injector.

As additional description to the embodiments described above, the present disclosure describes the following embodiments.

Embodiment 1 is a fuel injector, comprising: an upper housing portion that defines an inlet passage adapted to receive fuel and an impact face, the upper housing portion including a housing wall, the housing wall having thinned region that is thinner than a thicker region of the housing wall; a lower housing portion that defines an injector outlet adapted to dispense fuel; an electromagnetic coil assembly that surrounds the thinned region of the housing wall; and a movable pintle that is: (i) biased to a closed position that is adapted to prevent fuel from flowing through the injector outlet, and (ii) movable, responsive to magnetic force produced by energizing the electromagnetic coil assembly, to an open position that is adapted to permit fuel to flow through the injector outlet, wherein the thinned region of the housing wall spans the impact face along a pintle-movement axis that is defined by a direction in which the movable pintle is adapted to move between the closed position and the open position.

Embodiment 2 is the fuel injector of embodiment 1, wherein: the thicker region of the housing wall is offset from the impact face along the pintle-movement axis.

Embodiment 3 is the fuel injector of embodiment 2, wherein: the thicker region of the housing wall is adjacent the thinner region of the housing wall.

Embodiment 4 is the fuel injector of any one of embodiments 1-3, wherein: the housing wall surrounds the pintle-movement axis; the thinned region of the housing wall surrounds the pintle-movement axis; the thicker region of the housing wall surrounds the pintle-movement axis; and the thinned region of the housing wall is thinner than the thicker region of the housing wall at all corresponding locations around the pintle-movement axis.

Embodiment 5 is the fuel injector of any one of embodiments 1-4, wherein: the fuel injector defines a lift gap between the impact face and a top end of the movable pintle when the movable pintle is in the closed position; and the thinned region of the housing wall spans the lift gap along the pintle-movement axis.

Embodiment 6 is the fuel injector of embodiment 5, wherein: the housing wall defines an annular slot that surrounds the pintle-movement axis; the thinned region of the housing wall provides a bottom surface of the annular slot; and the bottom surface of the annular slot faces outward away from the pintle-movement axis.

Embodiment 7 is the fuel injector of any one of embodiments 5-6, wherein: the lift gap is less 600 microns in length.

Embodiment 8 is the fuel injector of any one of embodiments 5-7, wherein: the upper housing portion includes an upper housing body and upper housing inlet tube; the upper housing inlet tube defines the inlet passage; the upper housing body includes the housing wall with the thinned region and the thicker region; the inlet housing inlet tube is threaded into the upper housing body, enabling user adjustment to a length of the lift gap by twisting the inlet housing inlet tube further into or further out of the upper housing body.

Embodiment 9 is the fuel injector of any one of embodiments 1-8, wherein: the electromagnetic coil assembly includes an electromagnetic coil; and a center of the electromagnetic coil along the pintle-movement axis is located within the thinned region of the housing wall along the pintle-movement axis.

Embodiment 10 is the fuel injector of embodiment 9, wherein: the center of the electromagnetic coil along the pintle-movement axis is located above the impact face along the pintle-movement axis.

Embodiment 11 is the fuel injector of embodiment 10, wherein: a center of the thinned region is below the center of the electromagnetic coil along the pintle-movement axis.

Embodiment 12 is the fuel injector of any one of embodiments 1-11, wherein: the housing wall is formed of a stainless steel alloy that is magnetic.

Embodiment 13 is the fuel injector of any one of embodiments 1-12, wherein: a center of the thinned region along the pintle-movement axis is located below the impact face along the pintle-movement axis.

Embodiment 14 is the fuel injector of any one of embodiments 1-13, wherein: the thinned region of the housing wall provides greater magnetic flux in comparison to magnetic flux provided by the thicker region of the housing wall, when the electromagnetic coil assembly is energized.

Embodiment 15 is the fuel injector of any one of embodiments 1-14, wherein: the housing wall defines a periphery of the upper housing portion in a plane that is transverse to the pintle-movement axis, such that the electromagnetic coil assembly surrounds the upper housing portion.

Relational terms, such as up/down, above/below, and vertical/horizontal, are used in this disclosure with reference to the orientation of the fuel injectors in the sectional side views of, for example, FIGS. 3 and 13. Relational terms, such as inward/outward, are used in this disclosure with respect to a center axis of the injector (e.g., the pintle-movement axis 105, 205).

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims

What is claimed is:

1. A fuel injector, comprising:

an upper housing portion that defines an inlet passage adapted to receive fuel, wherein the inlet passage includes:

(i) an insert-receiving section that has an insert-receiving diameter; and (ii) a narrowed section that occurs after the insert-receiving section along a direction in which fuel is adapted to flow through the inlet passage and that has a narrowed diameter that is less than the insert-receiving diameter;

a lower housing portion that defines an injector outlet adapted to dispense fuel;

an electromagnetic coil assembly;

a movable pintle that is:

(i) biased to a closed position that is adapted to prevent fuel from flowing through the injector outlet; and (ii) movable, responsive to magnetic force produced by energizing the electromagnetic coil assembly, to an open position that is adapted to permit fuel to flow through the injector outlet;

a spring that:

(i) imparts a force to the movable pintle, with a first end of the spring contacting a first spring-seating surface of the movable pintle; and (ii) biases the movable pintle to the closed position; and a calibration insert that:

(i) is located within the insert-receiving section of the inlet passage;

(ii) has a periphery that is wider than the narrowed diameter of the narrowed section of the inlet passage;

(iii) defines a calibration insert fuel passage that extends through the calibration insert;

(iv) defines a ledge that is within the calibration insert fuel passage and that is offset from a bottom end of the calibration insert that is oriented toward the injector outlet, with the ledge providing a second spring-seating surface that contacts a second end of the spring; and (v) is user movable back and forth along a range of positions within the inlet passage, while the upper housing portion and the lower housing portion are assembled together, to change a distance between the first spring-seating surface of the movable pintle and the second spring-seating surface of the ledge of the calibration insert, and to calibrate the force imparted by the spring to the movable pintle.

2. The fuel injector of claim 1, wherein:

the range of positions within the inlet passage extend along an axis defined by a direction in which the movable pintle is adapted to move between the closed position and the open position.

3. The fuel injector of claim 1, wherein:

the calibration insert fuel passage comprises a bore;

the ledge defines a transition between (a) the insert-receiving section of the inlet passage, which has the insert-receiving diameter, and (b) the narrowed section of the inlet passage, which has the narrowed diameter.

4. The fuel injector of claim 1, wherein:

the spring is positioned within the inlet passage so that fuel that exits the calibration insert fuel passage passes through a center of the spring.

5. The fuel injector of claim 1, wherein:

the inlet passage comprises a bore that extends through the upper housing portion along an axis defined by a direction in which the movable pintle is adapted to move between the closed position and the open position.

6. The fuel injector of claim 1, wherein:

the calibration insert comprises a stainless steel body.

7. The fuel injector of claim 1, wherein:

the periphery of the calibration insert defines first threads;

the insert-receiving section of the inlet passage defines second threads; and the calibration insert is located within the inlet passage with the first threads and the second threads engaged.

8. The fuel injector of claim 7, wherein:

the inlet passage includes a first section that occurs before the insert-receiving section, along the direction in which fuel is adapted to flow through the inlet passage.

9. The fuel injector of claim 8, wherein:

a diameter of the first section of the inlet passage is greater than the insert-receiving diameter of the insert-receiving section of the inlet passage.

10. The fuel injector of claim 9, wherein:

the fuel injector includes a threadlocking substance located between the first threads and the second threads.

11. The fuel injector of claim 10, wherein:

the first threads and the second threads engage at a threaded portion of engagement that includes (i) an upper threaded portion of engagement between the calibration insert and the inlet passage that is proximal a fuel entrance to the inlet passage, and (ii) a lower threaded portion of engagement between the calibration insert and the inlet passage that is distal the fuel entrance to the inlet passage;

the threadlocking substance is present at the lower threaded portion of engagement and absent at the upper threaded portion of engagement; and an adhesive different from the threadlocking substance is present at the upper threaded portion of engagement and absent at the lower threaded portion of engagement.

12. The fuel injector of claim 1, wherein:

the calibration insert includes an upper surface that is proximal a fuel entrance to the inlet passage; and the upper surface includes a feature that is adapted to receive a user tool introduced into the inlet passage to move the calibration insert back and forth along the range of positions.

13. The fuel injector of claim 12, wherein:

the feature that is adapted to receive the user tool comprises a slot for a screwdriver.

14. The fuel injector of claim 13, wherein:

the slot includes a first slot portion separated from a second slot portion by the calibration insert fuel passage that extends through the calibration insert.

* * * * *